United States Patent
Höglund et al.

(10) Patent No.: US 12,150,060 B2
(45) Date of Patent: Nov. 19, 2024

(54) USER EQUIPMENT (UE) GROUPING FOR WAKE-UP SIGNAL (WUS) BASED ON PAGING PROBABILITY

(71) Applicant: Telefonaktiebolaget LM Ericsson (publ), Stockholm (SE)

(72) Inventors: Andreas Höglund, Solna (SE); Magnus Åström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 300 days.

(21) Appl. No.: 17/764,315

(22) PCT Filed: Oct. 2, 2020

(86) PCT No.: PCT/SE2020/050932
§ 371 (c)(1),
(2) Date: Mar. 28, 2022

(87) PCT Pub. No.: WO2021/066726
PCT Pub. Date: Apr. 8, 2021

(65) Prior Publication Data
US 2022/0377671 A1 Nov. 24, 2022

Related U.S. Application Data

(60) Provisional application No. 62/910,305, filed on Oct. 3, 2019.

(51) Int. Cl.
*H04W 52/02* (2009.01)
(52) U.S. Cl.
CPC .............................. *H04W 52/0235* (2013.01)
(58) Field of Classification Search
CPC ................................................ H04W 52/0235
(Continued)

(56) References Cited

U.S. PATENT DOCUMENTS

2012/0044910 A1* 2/2012 Maeda .................... H04L 5/001
370/332
2018/0026698 A1* 1/2018 Lee ........................ H04B 7/043
370/335
(Continued)

FOREIGN PATENT DOCUMENTS

WO 2019096912 A1 5/2019
WO 2020089427 A1 5/2020
(Continued)

OTHER PUBLICATIONS

"3GPP TS 36.211 V15.6.0", 3rd Generation Partnership Project; Technical Specification Group Radio Access Network; Evolved Universal Terrestrial Radio Access (E-UTRA); Physical channels and modulation (Release 15), Jun. 2019, pp. 1-239.
(Continued)

*Primary Examiner* — Mark G. Pannell
(74) *Attorney, Agent, or Firm* — Murphy, Bilak & Homiller, PLLC

(57) ABSTRACT

Embodiments include methods for a user equipment (UE) to receive wake-up signals (WUS) from a network node in a radio access network (RAN) coupled to a core network (CN). Such methods include determining a WUS group assigned to the UE and a WUS resource associated with the assigned WUS group, based on the following: a paging probability (PP) indication assigned to the UE; a plurality of discontinuous reception (DRX) parameters; a mapping between a plurality of PP indication values and a plurality of available WUS groups; and a first identifier associated with the UE. Such methods also include, during a time period of the WUS resource, monitoring for a group WUS associated with the assigned WUS group. Embodiments also include complementary methods for network nodes in the RAN and (Continued)

the CN, as well as UEs and network nodes configured to perform such methods. FIG. 10 is selected for publication.

19 Claims, 15 Drawing Sheets

(58) Field of Classification Search
USPC .......................................................... 370/311
See application file for complete search history.

(56) References Cited

U.S. PATENT DOCUMENTS

| | | | | |
|---|---|---|---|---|
| 2019/0045553 | A1* | 2/2019 | Zhang | H04W 56/001 |
| 2019/0090191 | A1* | 3/2019 | Liu | H04L 5/0053 |
| 2019/0349856 | A1* | 11/2019 | Liu | H04W 52/0216 |
| 2020/0053645 | A1* | 2/2020 | Charbit | H04W 76/28 |
| 2020/0107267 | A1* | 4/2020 | Wu | H04W 76/28 |
| 2020/0396687 | A1* | 12/2020 | Hwang | H04W 68/025 |
| 2021/0360582 | A1* | 11/2021 | Priyanto | H04W 4/08 |
| 2022/0174644 | A1* | 6/2022 | Shi | H04W 52/0229 |
| 2022/0377666 | A1* | 11/2022 | Shi | H04W 52/0229 |
| 2023/0134552 | A1* | 5/2023 | Kim | H04W 60/04 |
| | | | | 370/329 |

FOREIGN PATENT DOCUMENTS

| | | |
|---|---|---|
| WO | 2020157261 A1 | 8/2020 |
| WO | 2020165384 A1 | 8/2020 |

OTHER PUBLICATIONS

"3GPP TS 36.213 V15.6.0", 3rd Generation Partnership Project; Technical Specification Group Radio Access Network; Evolved Universal Terrestrial Radio Access (E-UTRA); Physical layer procedures (Release 15), Jun. 2019, pp. 1-551.

"3GPP TS 36.331 V15.6.0", 3rd Generation Partnership Project; Technical Specification Group Radio Access Network; Evolved Universal Terrestrial Radio Access (E-UTRA); Radio Resource Control (RRC); Protocol specification (Release 15), Jun. 2019, pp. 1-960.

"Further consideration on service based UE grouping for WUS", 3GPP TSG-RAN2 meeting#107, R2-1908869, Prague, Czech Republic, Aug. 26-30, 2019, pp. 1-7.

"Paging with fractional nB value", 3GPP TSG-RAN WG2 Meeting #103bis, R2-1815084, Chengdu, China, Oct. 8-12, 2018, pp. 1-3.

"Remaining issues on WUS configurations and procedures", 3GPP TSG RAN WG1 Meeting #93, R1-1807108, Busan, Korea, May 21-25, 2018, pp. 1-9.

"Service based WUS groups, common WUS and paging multiplexing", 3GPP TSG-RAN WG2 #107, Tdoc R2-1910434, Prague, Czech Republic, Revision of R2-1907912, Aug. 26-30, 2019, pp. 1-10.

"3GPP TS 36.304 V15.4.0", 3rd Generation Partnership Project; Technical Specification Group Radio Access Network; Evolved Universal Terrestrial Radio Access (E-UTRA); User Equipment (UE) procedures in idle mode (Release 15) 3GPP TS 36.304 V15.4.0, Jun. 2019, pp. 1-55.

* cited by examiner

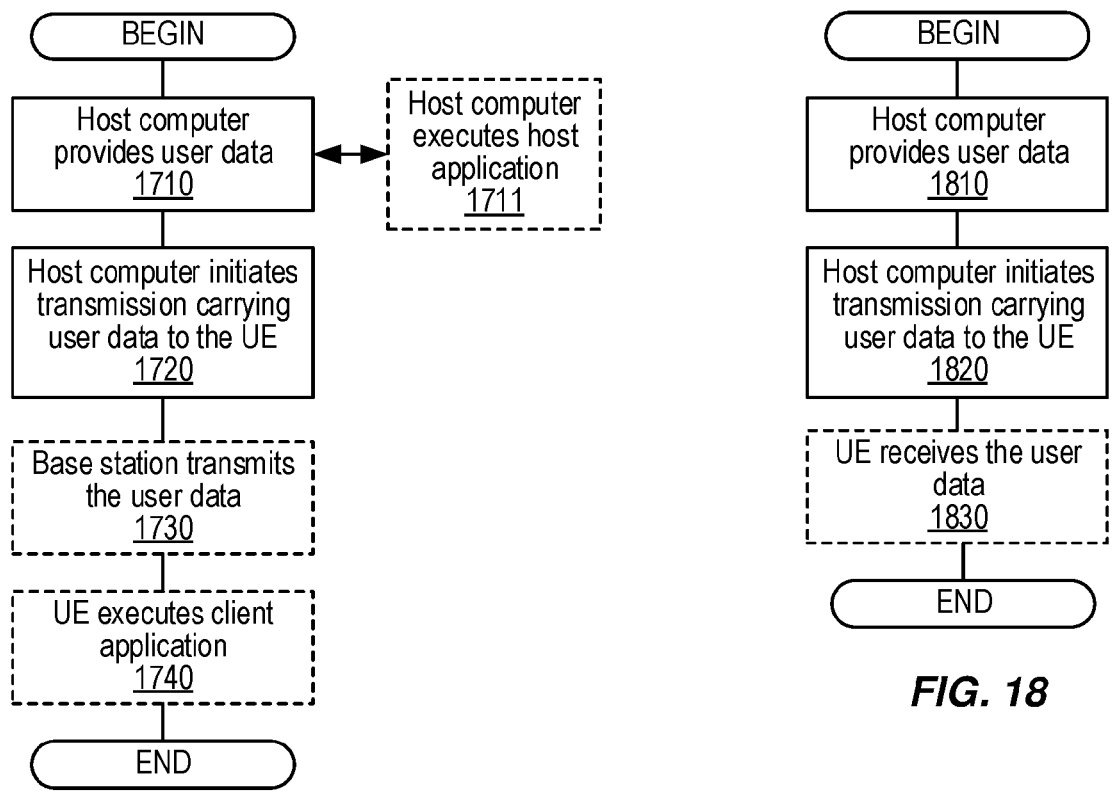
FIG. 17
FIG. 18
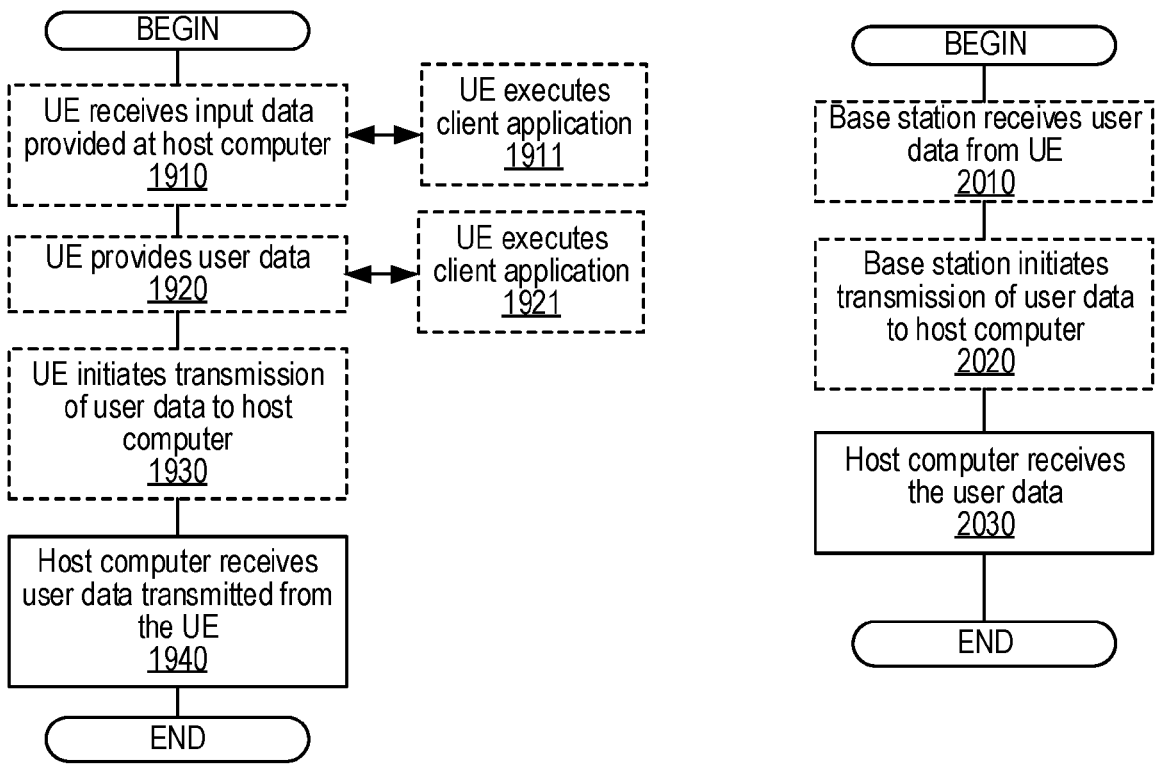
FIG. 19
FIG. 20

USER EQUIPMENT (UE) GROUPING FOR WAKE-UP SIGNAL (WUS) BASED ON PAGING PROBABILITY

TECHNICAL FIELD

The present application relates generally to the field of wireless communication networks and systems, and more specifically relates to improvements in wireless device energy consumption by use of wake-up signals (WUS).

BACKGROUND

Long Term Evolution (LTE) is an umbrella term for so-called fourth generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Rel-10 supports bandwidths larger than 20 MHz. One important requirement on Rel-10 is to backward compatibility with LTE Rel-8. This also includes spectrum compatibility in which a wideband LTE Rel-10 carrier (e.g., wider than 20 MHz) should appear as multiple carriers to an LTE Rel-8 ("legacy") terminal ("user equipment" or UE). Each such carrier can be referred to as a Component Carrier (CC). For efficient usage, legacy terminals can be scheduled in all parts of the wideband LTE Rel-10 carrier. This can be done by Carrier Aggregation (CA), in which a Rel-10 terminal receives multiple CCs, each having the same structure as a Rel-8 carrier. LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs (e.g., UE 120) in uplink and downlink, as well as security of the communications with UEs. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The SGW handles all Internet Protocol (IP) data packets (e.g., data or user plane) between the UE and the EPC and serves as the local mobility anchor for the data bearers when UE 120 moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR) —labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MIME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RISC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI) —a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3 shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (for 15-kHz SCS) or 24 (for 7.5-kHz SCS). A PRB spanning the same $N^{RB}_{sc}$ subcarriers during an entire subframe (i.e., $2N^{DL}_{symb}$ symbols) is known as a PRB pair. For a normal CP and 15-KHz sub-carrier bandwidth, a PRB pair comprises 168 REs.

Exemplary LTE FDD uplink (UL) radio frames can be configured in a similar manner as the exemplary FDD DL radio frame shown in FIG. 3. For example, using terminology consistent with the above DL description, each UL slot consists of $N^{UL}_{symb}$ OFDM symbols, each of which includes $N_{sc}$ OFDM subcarriers.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH).

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

In Rel-13 and Rel-14, 3GPP developed specifications for narrowband Internet of Things (NB-IoT) and machine-to-machine (M2M) use cases. These new radio access technologies provide connectivity to services and applications demanding qualities such as reliable indoor coverage and high capacity in combination with low system complexity and optimized device power consumption. LTE-M and NB-IoT enhancements include new DL control channels, respectively MPDCCH and NPDCCH.

In LTE, a UE in RRC_CONNECTED state monitors PDCCH for DL scheduling assignments (e.g., for PDSCH), UL resource grants (e.g., for PUSCH), and for other purposes. Depending on DRX configuration, a UE may spend a substantial part of its energy on decoding PDCCH without detecting a DL scheduling assignment or UL resource grant directed to it. Techniques to reduce unnecessary PDCCH monitoring, allow a UE to go to sleep more often and/or for longer periods, or allow a UE to wake up less frequently and/or for shorter periods can be beneficial.

One such technique introduced in LTE Rel-15 for LTE-M and NB-IoT is a Wake-up Signal (WUS) that can be detected by the UE using much less energy relative to MPDCCH/NPDCCH detection (referred to generically herein as "PDCCH detection"). When a UE detects a WUS intended for it, the UE will wake up and activate a conventional PDCCH decoder. The Rel-15 WUS uses a single WUS sequence per paging occasion (PO), such that all UEs belongs to the same group. In other words, a transmitted WUS associated with a specific PO may wake-up all UEs that are configured to detect paging at that PO. Thus, UEs not targeted by the page will wake up unnecessarily, leading to increased energy consumption.

WUS grouping (also referred to as group WUS or GWUS) is a feature in LTE Rel-16. In this technique, UEs are further divided into subgroups such that the number of UEs that are sensitive to a GWUS is less than all UEs associated with a PO related to the GWUS. This feature is intended to improve DL transmission efficiency and/or reduce UE energy consumption. Even so, there are various issues, drawbacks, and/or problems that can occur when Rel-16 UEs (GWUS) are deployed in a network, including when Rel-15 UEs (non-GWUS) and Rel-16 UEs (GWUS) are deployed in the same network.

SUMMARY

Exemplary embodiments disclosed herein address these and other problems, issues, and/or drawbacks of existing solutions by providing a flexible and efficient approach for distributing UEs among WUS groups in a substantially uniform and/or even manner.

Some embodiments include methods (e.g., procedures) for receiving wake-up signals (WUS) transmitted by a network node in a radio access network (RAN) coupled to a core network (CN). These exemplary methods can be performed by a user equipment (UE, e.g., wireless device, IoT device, MTC device, etc. or component thereof) configured to operate in the RAN.

These exemplary methods can include determining a WUS group assigned to the UE and a WUS resource associated with the assigned WUS group, based on the following:
  a paging probability (PP) indication assigned to the UE,
  a plurality of discontinuous reception (DRX) parameters,
  a mapping between a plurality of PP indication values and a plurality of available WUS groups, and
  a first identifier associated with the UE.
These exemplary methods can also include, during a time period of the WUS resource, monitoring for a group WUS (GWUS) associated with the assigned WUS group.

In some embodiments, these exemplary methods can also include receiving, from the RAN node, a paging configuration that includes the DRX parameters and the mapping (i.e., between the plurality of PP indication values and the plurality of available WUS groups). In some embodiments, the mapping can include respective numbers of WUS groups allocated to respective ranges of PP indication values.

In some embodiments, these exemplary methods can also include receiving the PP indication assigned to the UE from a network node in the CN or from a RAN node (e.g., serving eNB) that transmits the GWUS.

In some embodiments, these exemplary methods can also include determining the following based on the DRX parameters and a second identifier associated with the UE: a paging narrowband, a paging frame (PF), and a paging occasion (PO) within the paging frame. In addition, the determined WUS resource is located within the paging narrowband and the time period of the WUS resource ends at the beginning of a WUS gap before the paging occasion.

In some embodiments, the first identifier and the second identifier can be different portions of a third identifier associated with the UE. In other embodiments, the first identifier and the second identifier can be different identifiers associated with the UE.

In some embodiments, the determined WUS resource can be one of a plurality of available WUS resources, and each available WUS group is associated with only one of the available WUS resources. In some of these embodiments, each available WUS resource can be associated with available WUS groups mapped to a single range of PP indication values, or a plurality of adjacent ranges of PP indication values. In other of these embodiments, the available WUS groups are associated with sequential indices, and non-overlapping subsets of the sequential indices are associated with respective WUS resources, such that each available WUS group is mapped to one WUS resource.

In some embodiments, determining the assigned WUS group can be based on a function of the following:
  a total number of WUS groups associated with the PP indication assigned to the UE,
  a total number of available paging narrowbands,
  the UE's DRX cycle duration, and
  the first identifier associated with the UE.
Various exemplary functions are disclosed herein.

Other embodiments include methods (e.g., procedures) for transmitting wake-up signals (WUS) to one or more user equipment (UEs). These exemplary methods can be performed by a network node (e.g., eNB, gNB, or components thereof) of a RAN (e.g., E-UTRAN, NG-RAN, etc.) that is coupled to a core network (CN, e.g., EPC, 5GC).

These exemplary methods can include determining, for a first UE, an assigned WUS group and a WUS resource associated with the assigned WUS group, based on the following:
  a paging probability (PP) indication assigned to the first UE,
  a plurality of discontinuous reception (DRX) parameters,
  a mapping between a plurality of PP indication values and a plurality of available WUS groups, and
  a first identifier associated with the first UE.
These exemplary methods can also include, during a time period of the WUS resource, transmitting a group WUS (GWUS) associated with the assigned WUS group.

In some embodiments, these exemplary methods can include receiving, from the CN, a paging probability (PP) configuration including a plurality of available PP classes or a plurality of non-overlapping PP ranges. In some embodiments, the received PP configuration can also include an approximate distribution of UEs among the available PP classes or the PP ranges. In other embodiments, the received PP configuration can also include one of the following:
  an approximate distribution of UEs among the available PP classes or the PP ranges, or
  assignments of one or more UEs to respective available PP classes or PP ranges.
In some embodiments, these exemplary methods can also include determining the mapping between the plurality of PP indication values and the plurality of available WUS groups based on the PP configuration received from the CN and on a paging configuration of the network node. In some embodiments, the mapping can include respective numbers of WUS groups allocated to respective ranges of PP indication values.

In some embodiments, these exemplary methods can also include transmitting, to one or more UEs including the first UE, a paging configuration including the DRX parameters and the mapping.

In some embodiments, these exemplary methods can also include receiving, from the CN, a request to page the first UE. The assigned WUS group and the WUS resource can be determined in response to the request. In some embodiments, the request to page the first UE can also include the PP indication assigned to the first UE.

In some embodiments, these exemplary methods can also include determining the following based on the DRX parameters and a second identifier associated with the UE: a paging narrowband, a paging frame (PF), and a paging occasion (PO) within the paging frame. In addition, the determined WUS resource is located within the paging narrowband and the time period of the WUS resource ends at the beginning of a WUS gap before the paging occasion.

In some embodiments, the first identifier and the second identifier can be different portions of a third identifier associated with the UE. In other embodiments, the first identifier and the second identifier can be different identifiers associated with the UE.

In some embodiments, the determined WUS resource can be one of a plurality of available WUS resources, and each available WUS group is associated with only one of the available WUS resources. In some of these embodiments, each available WUS resource can be associated with available WUS groups mapped to a single range of PP indication values, or to a plurality of adjacent ranges of PP indication values. In other of these embodiments, the available WUS groups are associated with sequential indices, and non-overlapping subsets of the sequential indices are associated with respective WUS resources, such that each available WUS group is mapped to one WUS resource.

In some embodiments, determining the assigned WUS group can be based on a function of various parameters, such as discussed above in relation to UE embodiments.

Other embodiments include methods (e.g., procedures) for facilitating a radio access network (RAN) to transmit wake-up signals (WUS) to one or more user equipment (UEs). These exemplary methods can be performed by a network node (e.g., MME, AMF, or components thereof) of a core network (CN, e.g., EPC, 5GC) that is coupled to the RAN (e.g., E-UTRAN, NG-RAN, etc.).

These exemplary methods can include sending, to the RAN, a paging probability (PP) configuration including a plurality of available PP classes or a plurality of non-overlapping PP ranges. These exemplary methods can also include sending, to the RAN, a request to page a first UE.

In some embodiments, the PP configuration can also include an approximate distribution of UEs among the PP classes or the PP ranges. In other embodiments, the PP configuration can also include assignments of one or more UEs to respective PP classes or PP ranges.

In some embodiments, the request to page the first UE also includes a PP indication assigned to the first UE. In other embodiments, these exemplary methods can also include send, to the first UE via the RAN, a PP indication assigned to the first UE.

Other embodiments include UEs (e.g., wireless devices, IoT devices, MTC devices, etc. or component(s) thereof) or network nodes (e.g., base stations, eNBs, gNBs, MMEs, AMFs, etc. or component(s) thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

FIGS. 17-20 are flow diagrams illustrating exemplary methods (e.g., procedures) for a communication system, according to various exemplary embodiments of the present disclosure.

DETAILED DESCRIPTION

Figure 1:
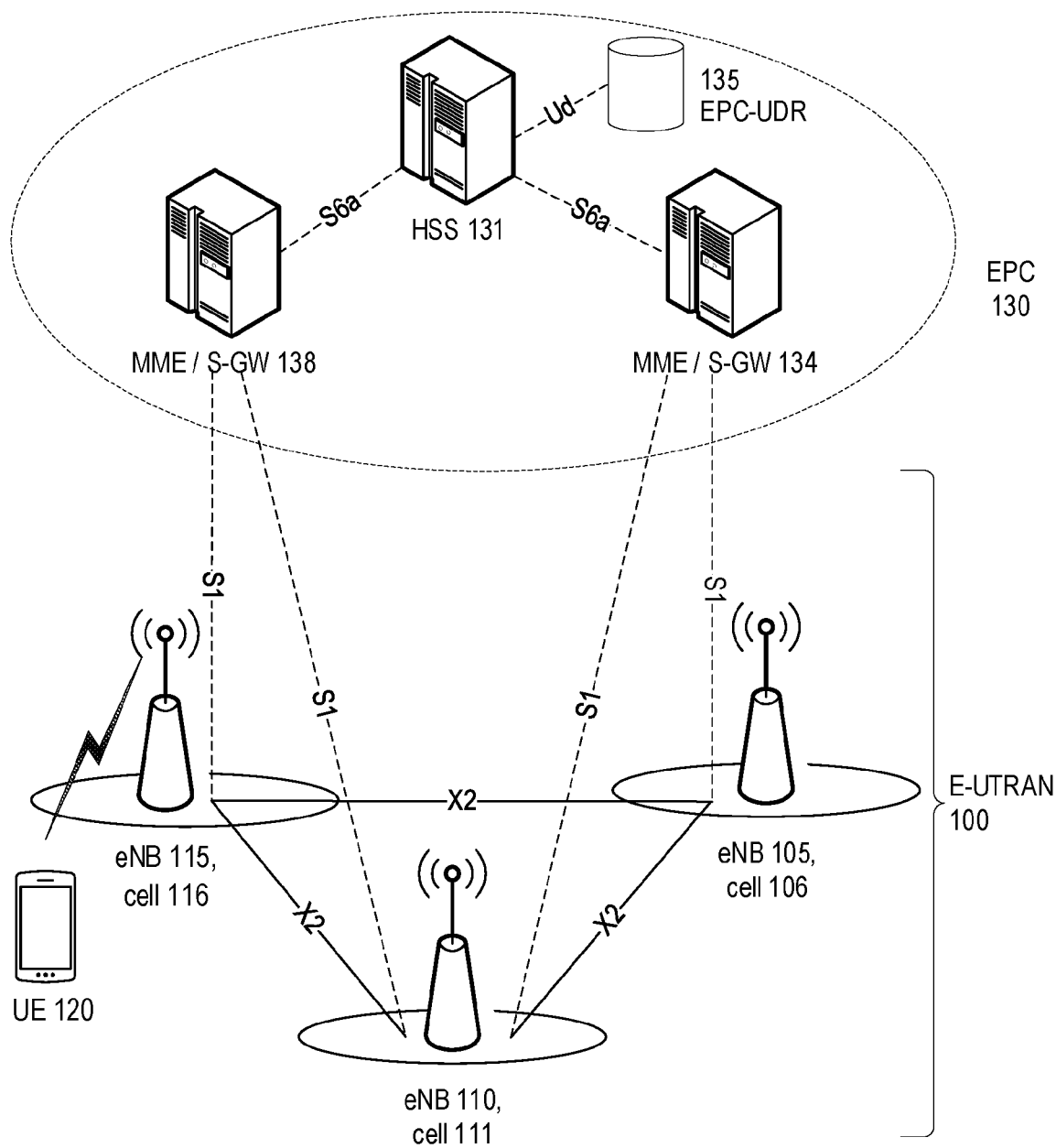
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
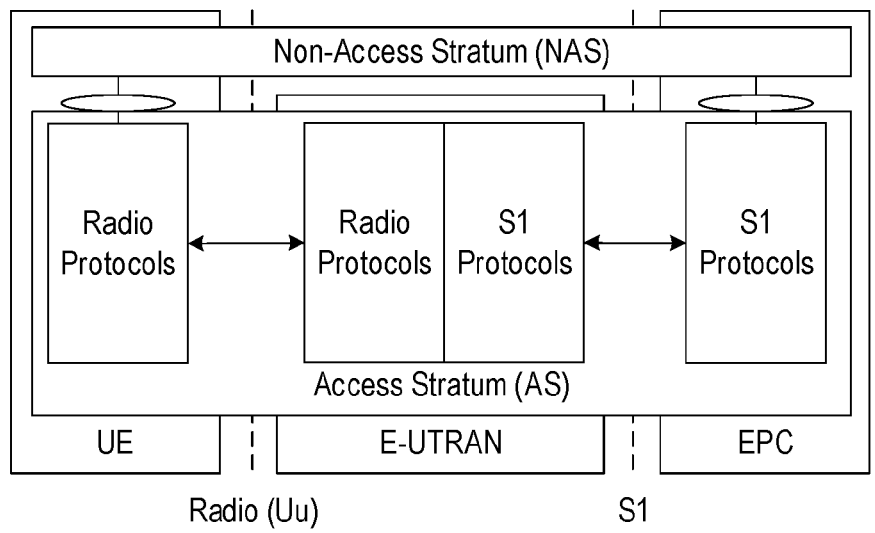
FIG. 2A is a high-level block diagram of an exemplary E-UTRAN architecture in terms of its constituent components, protocols, and interfaces.
Figure 2B:
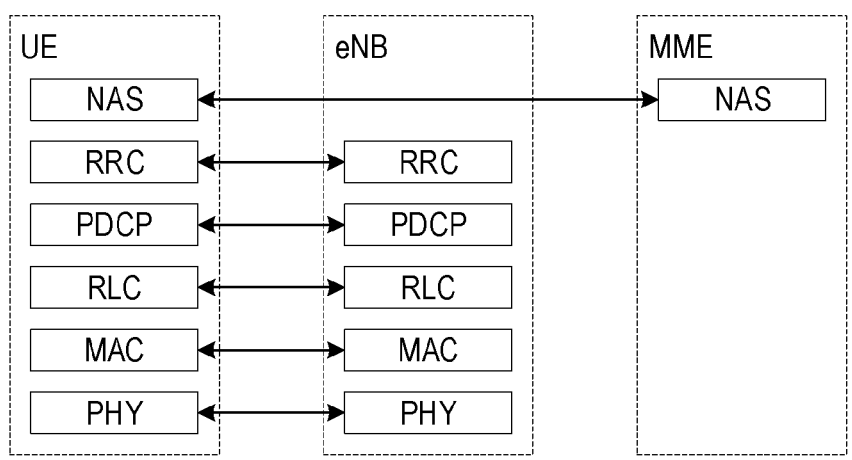
FIG. 2B is a block diagram of exemplary protocol layers of the control-plane portion of the radio (Uu) interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc.

are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, there are various issues, drawbacks, and/or problems that can occur when Rel-16 UEs (GWUS) are deployed in a network, including when Rel-15 UEs (non-GWUS) and Rel-16 UEs (GWUS) are deployed in the same network. These are discussed in more detail below.

The LTE-M specifications developed in 3GPP Rel-13 and Rel-14 include enhancements that support Machine-Type Communications (MTC, or LTE-M) with new UE categories (Cat-M1, Cat-M2), a reduced bandwidth of six PRBs for Cat-M1 (or up to 24 PRBs for Cat-M2). Similarly, the NB-IoT enhancements specified in Rel-13 and Rel-14 include a new radio interface and new UE categories, Cat-NB1 and Cat-NB2.

Bandwidth-reduced, low-complexity (BL) LTE-M UEs also can include Coverage Enhancements (CE), so that they are collectively known as BL/CE UEs. These UEs can operate in Coverage Enhancement Mode A (CEmodeA) which is optimized for no repetitions or a small number of repetitions, or in Coverage Enhancement Mode B (CEmodeB) which is optimized for moderate-to-large numbers of repetitions providing large coverage enhancement. More specifically, CEmodeA includes PRACH CE levels 0 and 1, while CEmodeB includes PRACH CE levels 2 and 3.

In general, these LTE-M enhancements introduced in Releases 13-15 for MTC will be referred to herein as "eMTC", including (not limited to) support for bandwidth limited UEs, Cat-M1, and coverage enhancements. This term is not used to refer to NB-IoT technology and enhancements, although the supported features are similar on a general level.

There are multiple differences between pre-Rel-13 LTE and the procedures and channels defined for eMTC and for NB-IoT. These differences include new physical downlink control channels (MPDCCH in eMTC, NPDCCH in NB-IoT) and a new physical random-access channel (NPRACH for NB-IoT). MPDCCH and NPDCCH are transmitted on resources of PDSCH but are logically separate from PDSCH.

Another difference is the coverage enhancement discussed above. By applying repetitions to the transmitted signals and channels, both eMTC and NB-IoT allow UE operation down to much lower SNR level compared to LTE. For example, eMTC/NB-IoT UEs can operate at $Es/Iot \geq -15$ dB, while legacy LTE UEs operate can operate at Es/Iot≥−6 dB. Because MPDCCH and NPDCCH uses repetitions, however, the UE may consume more energy receiving and decoding them than conventional PDCCH.

To support reliable coverage in the most extreme situations, both NB-IoT and LTE-M UEs can also perform link adaptation on all physical channels using subframe bundling and repetitions. This applies to (N/M)PDCCH and (N)PDSCH in the DL, and to (N)PUSCH, (N)PRACH, and PUCCH (only for LTE-M) in the UL.

As specified in 3GPP TS 36.304, for a particular UE, the associated UE_ID (which is based on the UE's IMSI) determines the system frame number (SFN) of the paging frame (PF) of the UE according to the following equation:

$$\text{SFN mod } T = (T \text{ div } N)*(\text{UE\_ID mod } N), \quad (1)$$

where "mod" is the modulus (i.e., remainder of division) operation. The paging occasions (POs) for the UE in this radio frame are then determined by the parameter i_s and the subframes pointed out by the corresponding table in 3GPP TS 36.304 section 7.2 according to:

$$i\_s = \text{floor}(\text{UE\_ID}/N) \text{mod } Ns. \quad (2)$$

Since i_s is determined from UE_IDs that are assumed to be distributed approximately randomly, UEs are distributed approximately randomly among different POs. For paging over narrowbands (LTE-M) and non-anchor carriers (NB-IoT), the number of IMSI bits used to determine UE_ID was increased to 14, such that UE_ID=IMSI mod 16384 for these cases.

Even so, it is not practical to use every radio frame as a PF when using repetitions. As such, LTE-M and NB-IoT UEs that share a PF will typically also share a PO. For example, if the PO density per radio frame is denoted nB/T, then nB values 2T or 4T are unlikely to be used in combination with coverage enhancements for NB LTE-M and NB-IoT.

In Rel-13 NB-IoT, paging of UEs is performed on the DL anchor carrier, which is one PRB (or 180 kHz) in bandwidth. Rel-13 also supports multi-PRB operation in which other carriers are configured, but UEs can only be assigned to those in RRC_CONNECTED state. That is, all RRC_IDLE mode operations are performed on the DL and UL anchor carriers, respectively. In addition, only FDD operation is supported in Rel-13 NB-IoT.

In Rel-14, support for paging and random access was introduced on non-anchor carriers to distribute the paging and random access load over all carriers. This means that NPRACH and PCCH can be configured also for non-anchor carriers, which are then used by UEs and eNB for random access and paging accordingly.

The paging carrier in NB-IoT is determined based on UE_ID in the following way. The index for the paging carrier of a UE is the lowest value that fulfills the following condition, in which W are the paging weights for the paging carriers:

$$\text{floor}(\text{UE\_ID}/(N*Ns)) \text{mod } W < W(0) + W(1) + \ldots + W(n). \quad (3)$$

In contrast to NB-IoT, described above, paging in LTE-M works differently. In LTE-M several 'narrowbands' can be defined, where each narrowband is corresponding to six non-overlapping PRBs. A UE will only monitor MPDCCH (e.g., for pages) in one narrowband at a time but frequency hopping is applied according to a specified pattern. The starting narrowband for paging is also defined based on UE_ID and allows for better frequency multiplexing of the UEs and the paging load.

According to 3GPP TS 36.304, a UE is assigned a paging narrowband by the following equation, where Nn=paging-narrowBands:

$$\text{PNB} = \text{floor}(\text{UE\_ID}/(N*Ns)) \text{mod } Nn. \quad (4)$$

Further, the number of narrowbands, Nn, that can be supported by a certain system bandwidth is given by the table below:

| System BW (MHz) | #PRBs | Fixed # narrowbands |
| --- | --- | --- |
| 1.4 | 6 | 1 |
| 3 | 15 | 2 |
| 5 | 25 | 4 |
| 10 | 50 | 8 |
| 15 | 75 | 12 |
| 20 | 100 | 16 |

In RRC_IDLE state, a UE monitors PDCCH (e.g., legacy PDCCH, MPDCCH, or NPDCCH, according to capabilities) periodically for scheduling of paging requests to be subsequently transmitted on PDSCH. In RRC_CONNECTED state, a UE monitors PDCCH for UL/DL data scheduling on PDSCH/PUSCH as well as for other purposes. In between these monitoring occasions, the UE goes to sleep to reduce energy consumption. This sleep-wake cycle is known as "discontinuous reception" or DRX. The amount of UE power savings is related to wake period ("DRX ON") duration as a fraction of the entire DRX duty cycle.

Depending on DRX setting, a UE may spend a substantial part of its stored energy on decoding PDCCH without detecting a PDSCH/PUSCH scheduled for it. In Rel-15, the wake-up signal (WUS) was introduced in order to reduce UE power consumption. WUS are short in duration due to very small information content, so that WUS monitoring consumes less UE energy than monitoring (M/N)PDCCH for pages. A WUS is transmitted only when any of the UEs sharing an associated PO is/are being paged, and only in the carrier (or narrowband for LTE-M) where the UE(s) is/are being paged.

Figure 4:
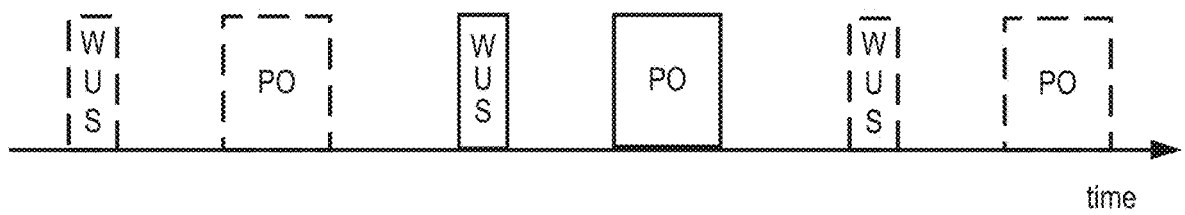
FIG. 4 shows an exemplary timeline that illustrates an association between wake-up signals (WUS) and paging occasions (PO) in LTE.

In other words, a WUS is a short duration signal that indicates to a UE that it should continue to decode a DL control channel that is associated with the WUS, e.g., NPDCCH for NB-IoT UEs, MPDCCH for eMTC UEs, PDCCH for legacy UEs. If such signal is not transmitted (or if the UE does not detect it), then the UE can go back to sleep without decoding the (N/M)PDCCH. FIG. 4 shows an exemplary timeline that illustrates the association between WUS and subsequent (N/M)PDCCH, which is indicated as a PO. Note that solid lines indicate actual WUS/PO positions, while the dashed lines indicate positions of possible WUS/PO that were not transmitted (e.g., due to no paging of the UE). In this manner, WUS can be thought of as a discontinuous transmission (DTX).

The decoding time for a WUS is considerably shorter than that of the full NPDCCH because WUS only needs to contain one bit of information, while NPDCCH may contain up to 35 bits of information. This reduced decoding results in reduced UE energy consumption and longer UE battery life. The sleep time between actual WUS also improves these aspects of UE performance.

Put differently, for the same channel and same missed detection rate, it is possible to transmit a shorter WUS compared to the PDCCH since the WUS carries less information. The shorter WUS requires the UE's receiver to be turned on for less time and facilitates faster UE baseband processing, both of which reduce UE energy consumption.

In some cases, a UE may include a dedicated, low-complexity receiver for the WUS. The primary receiver will only be turned on (e.g., to decode PDCCH) based on an indication that the dedicated receiver has detected a WUS. This arrangement can facilitate the UE remaining in deep sleep state for long durations with very low energy consumption.

The Rel-15 WUS was designed such that all UEs belongs to the same group. That is, a transmitted WUS associated with a specific PO (e.g., in a PDCCH) may wake-up all UEs that are configured to detect paging at that PO. This means that all UEs that are not targeted by the page will wake up unnecessarily, leading to increased energy consumption.

Both eMTC and NB-IoT have been developed with varying applications that include widely different use cases in terms of paging rates, latency, baseband processing power etc. For example, a power switch for streetlights may only be paged once or twice daily, while a machine controller device may be paged every second. As such, grouping both of these UEs into a single paging group can significantly affect the UE energy consumption in the respective use cases.

Figure 3:
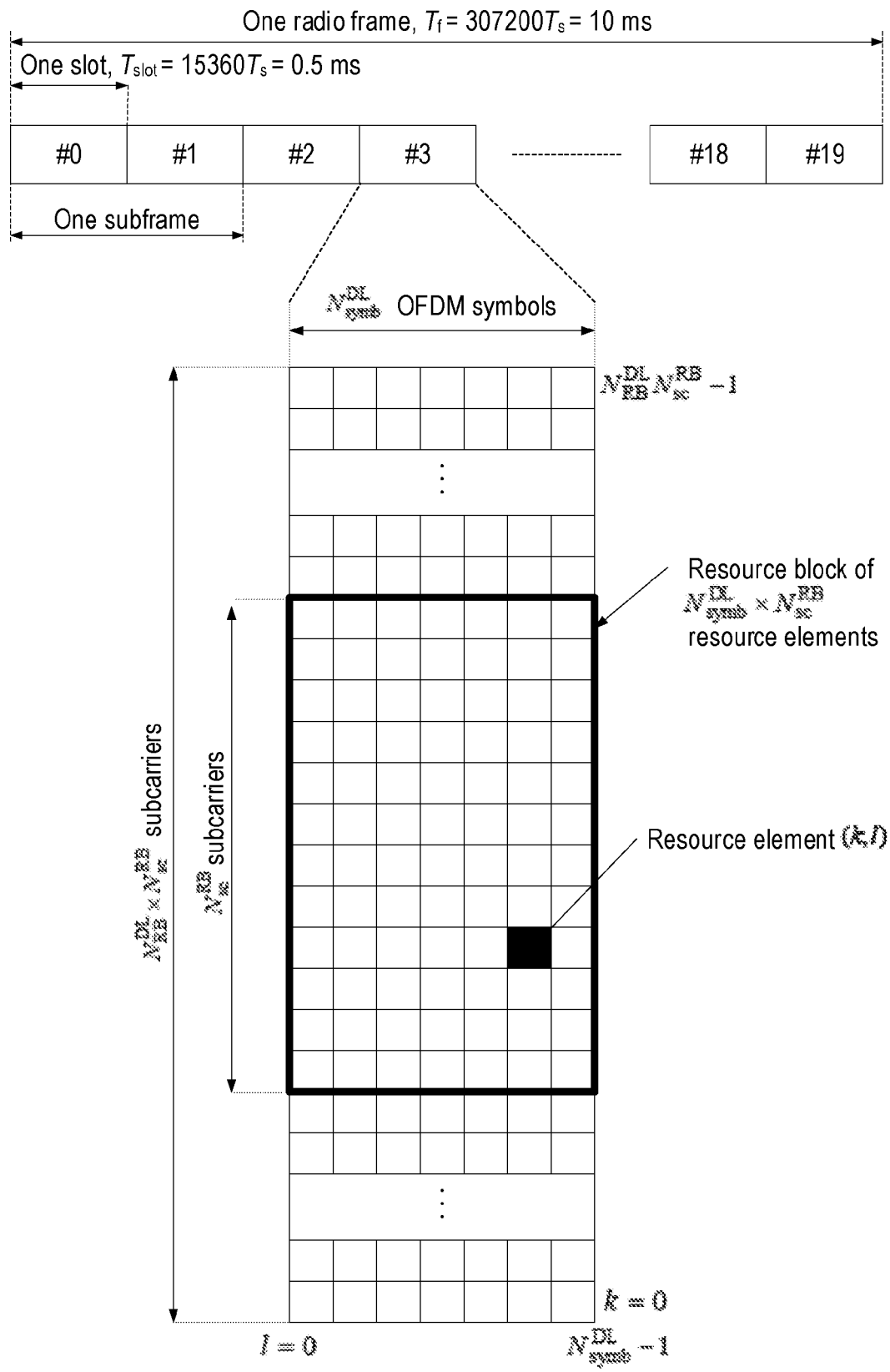
FIG. 3 is a block diagram of an exemplary downlink LTE radio frame structure used for frequency division duplexing (FDD) operation.

Three different WUS gaps were introduced in Rel-15—DRX, short eDRX, and long eDRX—such that in practice there are three time-multiplexed WUS groups even in Rel-15. Each WUS gap is associated with a single WUS resource. In general, a "WUS resource" can refer to a particular time-frequency resource (e.g., within the grid shown in FIG. 3) that is assigned to carry a WUS.

In Rel-16, however, it was agreed to include explicit UE grouping, such that the number of UEs that are sensitive to a WUS transmitted in a particular PO and WUS gap is less than the total number of UEs that share the particular PO and WUS gap. More specifically, multiple WUS sequences were defined such that each WUS indicates that only part of the UEs sharing a WUS gap and a PO are being paged.

The group WUS is also referred to as GWUS. This feature is intended to improve DL transmission efficiency and/or reduce UE energy consumption. More specifically, information was added to the WUS to indicate that only part of the UEs sharing a WUS gap and a PO are being paged.

This group WUS feature (also referred to as GWUS) is intended to improve DL transmission efficiency and/or reduce UE energy consumption. From a UE perspective, the GWUS reduces false paging, i.e., the risk that the UE is unnecessarily awakened when another UE is being paged. This is achieved by introducing more WUS sequences such that UEs only wake up for paging detection based on detecting their assigned WUS sequence.

One problem is that Rel-16 UEs cannot be awakened by the Rel-15 WUS signal, and the Rel-16 GWUS cannot be altered in order to be backwards compatible. Furthermore, there can be Rel-16 UEs that do not support either WUS or GWUS since support for either of these features is optional.

It was initially agreed in 3GPP that the Rel-16 UE grouping should be based on at least UE_ID. Further agreements have been made for UE grouping based on paging probability. The intention of these further agreements is that a Rel-16 GWUS UE will be configured with some paging probability indication (e.g., class, type, percentage, etc.) by the MME via non-access stratum (NAS) signaling. However, this configured parameter may not closely represent the actual UE paging probability that will depend on paging configurations of cells in which the UE operates, such as physical resources allocated to paging, PO density, number of paging narrowbands/carriers, etc. The actual UE paging probability can also be affected by UE-specific capabilities (e.g., Rel-14 non-anchor paging, etc.). In other words, determining which WUS UE group that a UE should be assigned based on paging probability can be very complex.

Exemplary embodiments of the present disclosure address these and other issues, drawbacks, and/or problems by providing flexible mechanisms for both a UE and a network node (e.g., eNB wanting to page the UE) to determine the UE's paging WUS group as a function of UE_ID, paging probability information (e.g., for Rel-16), and/or WUS gap (e.g., for Rel-15 and Rel-16). Such mechanisms utilize portions (e.g., bits) of the UE's IMSI other than the IMSI portions used to distribute UEs over paging frames and paging narrowbands/carriers. For example, a UE's WUS group can be determined according to the following equation:

$$\text{WUSgroup}=\text{floor}(\text{floor}(\text{UE\_ID}/N*Ns)/Nn)\text{modulo } Nw, \quad (5)$$

where Nw is the number of WUS UE groups assigned to the UE's "Paging Probability Class" (PP class), Nn is the number of available paging narrowbands, N is min(T, nB), Ns is max(1, nB/T), T is the UE's DRX cycle, and nB is a multiple or sub-multiple of T and indicates a PO density for the UE. Using these definitions, (5) can be rewritten as:

$$\text{WUSgroup}=\text{floor}(\text{floor}(\text{UE\_ID}/(\min(T,nB)*\max(1, nB/T)))/Nn)\text{modulo } Nw. \quad (5a)$$

By determining UE grouping into WUS in this manner, exemplary embodiments can achieve a uniform distribution among UEs with similar paging probability (e.g., within a "paging probability class"), thereby minimizing the false paging rate and maximizing the performance gains of the Rel-16 GWUS feature.

In the following description, unless specifically stated otherwise, the term "PP class" is used generically to refer to any type of paging probability (PP) indication (e.g., class, type, percentage, fraction, etc.) that can be assigned and provided to respective UEs by the RAN and/or the CN.

Figure 5:
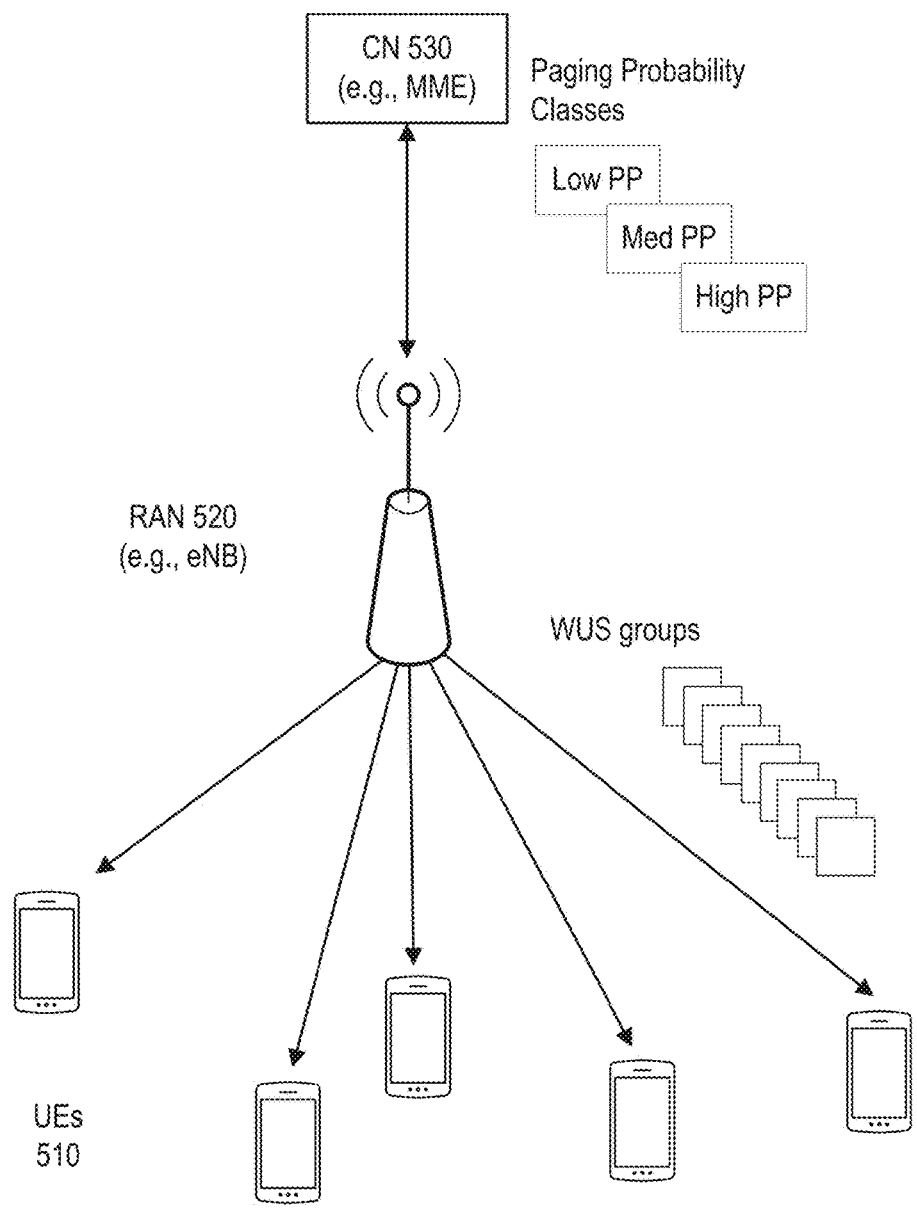
FIG. 5 illustrates an exemplary interaction between a core network (CN) and a radio access network (RAN) in determining UE grouping for WUS, according to various exemplary embodiments of the present disclosure.

As mentioned above, the actual paging probability can depend on the paging configuration of the particular network node in the RAN that will page a UE. As such, various embodiments rely on interaction between the CN node (e.g., MME) that configures the UE via NAS signaling and the RAN node (e.g., eNB) that will page the UE. FIG. 5 illustrates an exemplary interaction between a CN (530) and a RAN (520) in determining grouping of UEs (510) for WUS, according to various exemplary embodiments of the present disclosure. The CN can be an EPC (e.g., as shown in FIG. 1) including one or more MMEs. Alternately, the CN can be a 5GC including one or more access and mobility management functions (AMFs). The RAN can be an E-UTRAN (e.g., as shown in FIG. 1) including one or more eNBs. Alternately, the RAN can be an NG-RAN including one or more gNBs.

In general, various embodiments can be illustrated in the context of the exemplary network shown in FIG. 5 based on the following operations:

1. MME determines PP classes and configures and/or allocates UEs in the RAN to respective PP classes based on NAS signaling (e.g., via RAN). Note that MME may base the UE allocation on measurements of the UE paging behavior over time. In some cases, an "unassigned" class can be used for UEs that have insufficient data for allocation into another PP class. Alternately, the PP classes may be pre-configured, e.g., as specified in a 3GPP standard.
2. Optionally, the MME can send the configured PP classes (and related information) to eNB(s) in the RAN.

3. eNB configures WUS resources, UE groups, and mapping between UE groups and PP classes. The UE also broadcasts system information that can be used by UEs to determine their mapping into a particular WUS group.
4. eNB determines a particular UE's group, among all UE groups within the UE's configured PP class, based on UE_ID.
5. The particular UE also determines its group, among all UE groups within the UE's configured PP class, based on UE_ID in the same manner as the eNB (e.g., based on the broadcast system information).

In the example shown in FIG. 5, the MME has configured three PP classes: 'PP Low', 'PP Medium', and 'PP High'. In addition, the eNB has configured a number of WUS groups. In some embodiments, the MME may signal some information about the PP class configurations to the eNB (e.g., the number or type of PP classes configured, range of PP for each class, etc.). In some embodiments, the MME can also include information about UE distribution among the configured PP classes (e.g., number or percentage of UEs in each PP class), which can enable the eNB to configure an appropriate number of groups for each configured PP class. In other embodiments, where the PP classes are pre-configured (e.g., specified in a 3GPP standard), the MME may not need to inform the eNB about PP class configurations.

In some embodiments, different eNBs can configure different number of UE groups, and the mapping between groups and PP classes can be different in various eNBs in the same MME Tracking Area (TA). In some embodiments, eNBs can determine a mapping between PP classes and groups based on pre-configured information (e.g., a file or database). In some embodiments, eNBs can determine a mapping between PP classes and groups based on information provided by another network node, e.g., the MME.

As mentioned above, in some embodiments, the eNB can broadcast (e.g., in system information for a cell) the information needed by UEs to determine their respective WUS groups, which can be the same information that the eNB uses to determine respective WUS groups for the UEs. In this manner, the UEs and the eNB have a common understanding on WUS group determination. In some embodiments, the eNB can also provide (e.g., in system information) the number of UE groups for each PP class. Furthermore, the mapping between PP classes and a UE group or UE group/resource combinations can be determined from implicit indexing of the groups (or combinations), or by explicit signaling.

In some embodiments (referred to as "eNB-centric"), the MME can assign paging probability indications to GWUS UEs over NAS as a percentage or other number in a predetermined range, rather than as an enumerated PP class. As mentioned above, any such number will be as estimation and not the exact paging probability. In some of these embodiments, the mapping of UEs to WUS groups based on paging probability information can be determined by the eNB. For example, the eNB could define PP classes (or ranges) such that UEs with paging probability 0-30% belong to PP class low, UEs with paging probability 31-69% belong to PP class medium, and UEs with paging probability 70-100% belong to PP class high. In such embodiments, the MME would not need to communicate the number of PP classes to the eNB (e.g., these are pre-configured). Alternately, the MME can map PP percentages to PP classes in the same manner and communicate the PP classes to the eNB, as discussed above.

Figure 6:
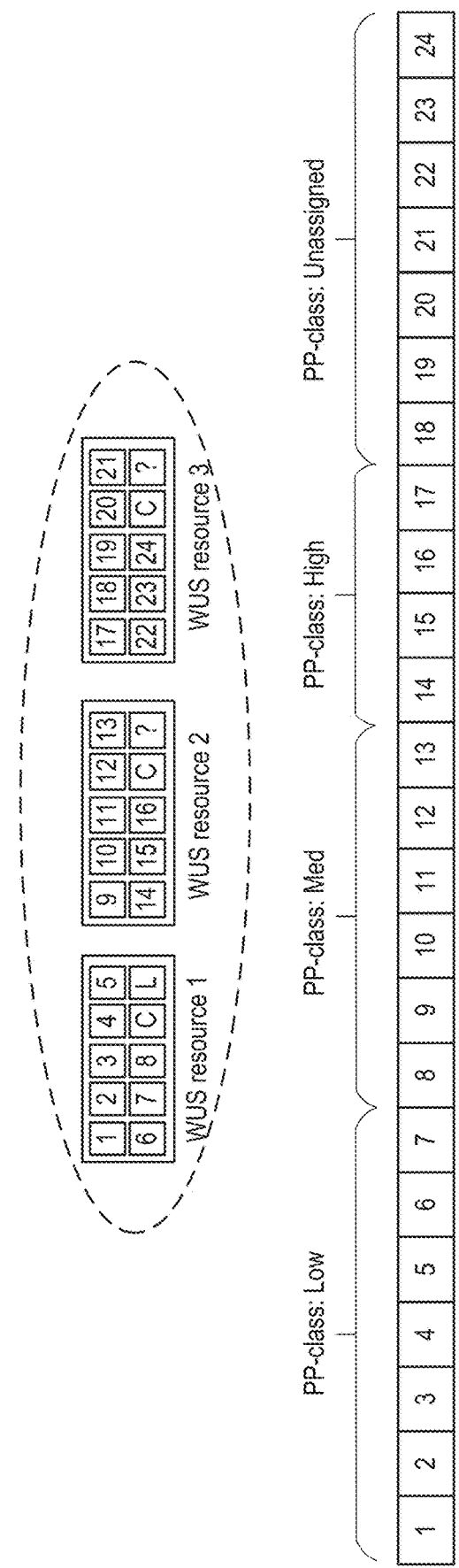
FIG. 6 illustrates an exemplary relationship between paging probability (PP) classes, WUS resources, and UE WUS grouping for LTE-M.
Figure 7:
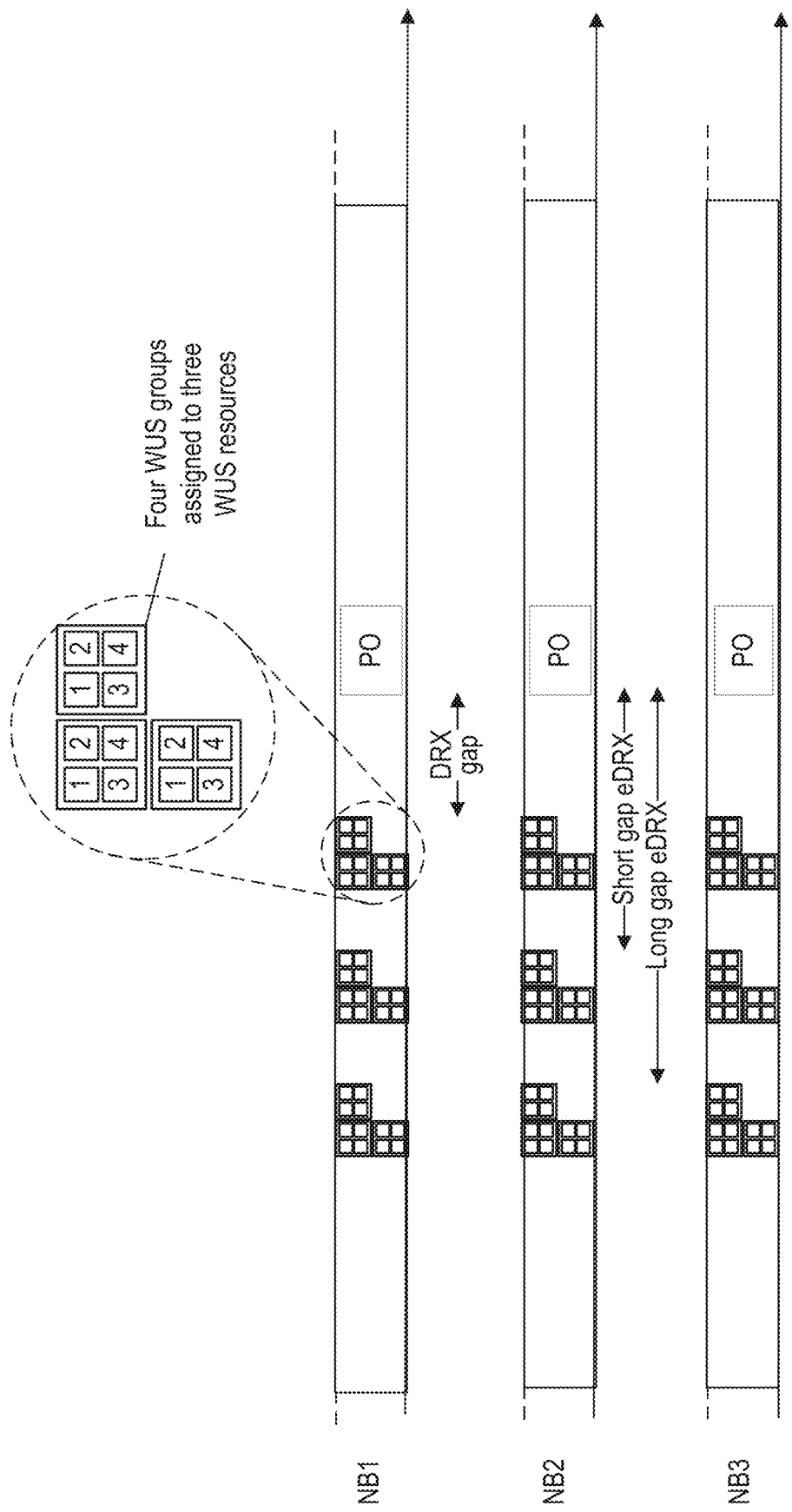
FIG. 7 illustrates an LTE-M paging arrangement of four WUS groups assigned to three WUS resources that occur in three different paging narrowbands.

FIG. 6 illustrates an exemplary relationship between PP classes, WUS resources, and UE WUS groups for LTE-M. As mentioned above, in Rel-15 the UE is configured with one of three WUS gap lengths (e.g., DRX, short eDRX, or long eDRX) with one WUS resource for each gap length. In Rel-16, up to four (4) different WUS resources can be configured for each WUS gap length in LTE-M (maximum two for NB-IoT), including the shared legacy WUS sequence. Three are configured in FIG. 6 and are labelled WUS resource 1, 2, and 3. FIG. 7 illustrates an LTE-M paging arrangement of four WUS groups assigned to three WUS resources that occur in three different paging narrowbands. In addition, the three WUS resources occur in three different WUS gap lengths, i.e., DRX gap, short eDRX gap, and long eDRX gap.

Furthermore, FIG. 6 shows 24 WUS groups (labelled 1-24) divided into four PP classes: low, medium, high, and unassigned. For example, UEs configured as PP class low can be placed in any of groups 1-7, UEs configured as PP class medium can be placed in any of groups 8-13, etc. In Rel-16, up to eight (8) WUS groups can be assigned to any WUS resource. For example, WUS groups 1-8 are assigned to WUS resource 1 in FIG. 6. In addition, a WUS resource can carry a WUS (e.g., a sequence) for Rel-15 legacy UEs (labelled "L" in WUS resource 1) and a Rel-16 common WUS (labelled "C"). In other words, each WUS resource can carry up to 10 different WUS (e.g., 10 different sequences).

In general, the number of WUS UE groups can be configured to be different for different WUS resources. In some embodiments, to simplify the mapping of a UE to a WUS group, only the total number of WUS UE groups is considered for the determination of a UE's WUS UE group. For example, this can be done by mapping WUS groups having sequential indices to the same WUS resource, with the mapping order of WUS group indices corresponding to WUS resource indices. Put differently, non-overlapping subsets of the sequential indices are associated with respective WUS resources. As a more specific example, in FIG. 6, WUS group indices 1-8 are mapped to WUS resource 1, WUS group indices 9-16 are mapped to WUS resource 2, and WUS group indices 17-24 are mapped to WUS resource 3.

In other embodiments, the mapping between WUS groups and WUS resources can also be based on PP class. For example, all groups of PP class low can be assigned to WUS resource 1, all groups of PP class medium can be assigned to WUS resource 2, etc. In this manner, when UEs in two or more groups of the same PP class are paged simultaneously, the paging does not "spill over" to a different PP class, which can avoid reducing paging performance in lower PP classes. Alternatively, only WUS groups in adjacent PP classes are allocated to the same resource, which reduces but does not avoid this spill-over effect. In general, the number of groups assigned to each WUS resource can vary and/or be configured separately, since the optimal number of UE groups will differ depending on the paging rate and/or the number of UEs per WUS resource.

As explained above, the paging probability partitioning could be performed by MME or eNB. In this way, for a UE of PP class medium, WUS groups 8-13 would be considered for the UE's group selection in the arrangement shown in FIG. 6. When the UE is being paged, the MME includes the UE's paging probability information (e.g., PP class or percentage) in the paging request to the eNB. This is the same information provided to the UE via NAS signaling, and the eNB is required to have this information to perform the group selection in the same manner as the UE.

In the exemplary arrangement shown in FIG. 6, the Rel-15 legacy WUS ("L") is only configured in, at most, one WUS resource. In some embodiments, the legacy WUS sequence is reused as the mobility group sequence. In this manner, the gains of a mobility WUS group can be realized without having to reserve one of the WUS sequences that could be otherwise used for normal WUS UE groups.

The eNB and UE can determine the WUS group for the UE (e.g., from among the groups associated with the UE's assigned PP class or percentage) in various ways according to different embodiments. Initially, the eNB and UE determine a paging narrowband/carrier, a paging frame, a paging occasion, and a WUS resource based on UE_ID and the WUS gap, according to existing procedures (e.g., defined in 3GPP TS 36.304). Next, the eNB and UE can determine a WUS group based UE_ID in a manner that achieves a substantially uniform and/or even distribution of UEs over the WUS UE groups associated with the UE's assigned PP class. One option for this determination is given in (5)/(5a) above. Another option can be expressed as:

$$WUSgroup = floor(UE\_ID/(N*Ns*Nn)) \bmod Nw \quad (6)$$

where Nw is the number of WUS UE groups for the UE's PP class, Nn is the number of paging narrowbands available, N is min(T, nB), Ns is max(T, nB), T is the UE's DRX cycle duration (e.g., in seconds), and nB is an integer multiple (e.g., kT) or integer sub-multiple (e.g., k/T) of T and indicates a PO density for the UE.

In this manner, UEs that are already sharing a Paging Frame (PF) and narrowband/paging carrier are not all put in the same WUS UE group while other WUS UE groups are left empty or underutilized. This can be achieved by using different bits of the IMSI (e.g., as the UE_ID) for determining WUS group than for determining the PF or narrowband/paging carrier.

Figure 8:
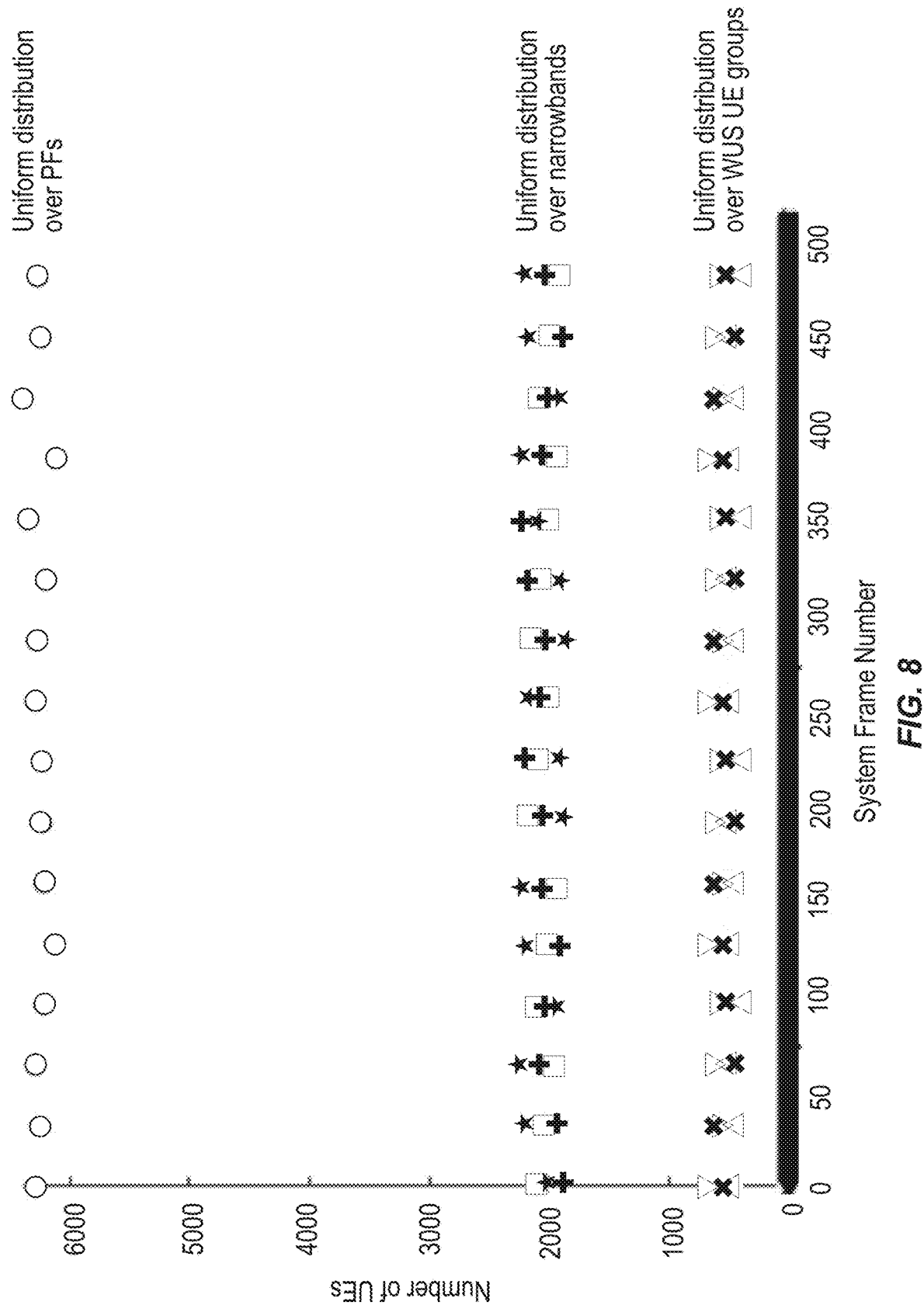
FIG. 8 illustrates an exemplary uniform distribution of UEs among WUS groups, according to various exemplary embodiments of the present disclosure.

FIG. 8 illustrates an exemplary uniform distribution of UEs among WUS groups, according to the technique embodied by equations (5)/(5a) above. In the illustrated scenario, UEs in one narrowband are uniformly distributed over four configured WUS UE groups, hence reducing the false paging rate and enabling the Rel-16 GWUS feature to realize its associated performance gains. FIG. 8 also shows that UEs are uniformly distributed over narrowbands and PFs. Note here that a "uniform distribution" (or "uniformly distributed") does not necessarily require an exact uniform distribution, but can encompass substantially uniform distributions within a range of acceptability, uncertainty, etc.

Note that in case no PP classes are configured, or if paging probability information is not used, the solution falls back to a uniform distribution of UEs over all WUS UE groups based on UE_ID. And if the number of configured PP classes is equal to the number of configured WUS groups, the UE_ID information will not impact the determination of the WUS group, which will instead be determined by the UE's PP-class/paging probability information. This scenario is most relevant when the eNB determines the number of PP classes.

In various embodiments, different portions of the IMSI (e.g., different numbers of IMSI bits) can be used to determine the UE_ID on which the WUS group determination is based. This can be greater than, equal to, or less than the number (i.e., 14, since 2^14=16384) currently used for other determinations (e.g., narrowband).

In other embodiments, UE_ID used for WUS group determination can be based on a different identifier than IMSI, e.g., a UE's temporary mobile subscriber identity (TMSI).

In some embodiments, an MME (or eNB) can change a UE's PP class to a different PP class than the one to which the UE was initially assigned or allocation. This procedure is similar to the initial assignment procedure, discussed above, but is initiated by the MME (or eNB) determining that the current paging properties and/or requirements of the UE differ from the PP class to which the UE is presently assigned.

Although the above description is given in terms of LTE-M and NB-IoT, exemplary embodiments are equally applicable to similar GWUS arrangements used in 5G/NR or another radio access network (RAN) and/or radio access technology (RAT).

Figure 9:
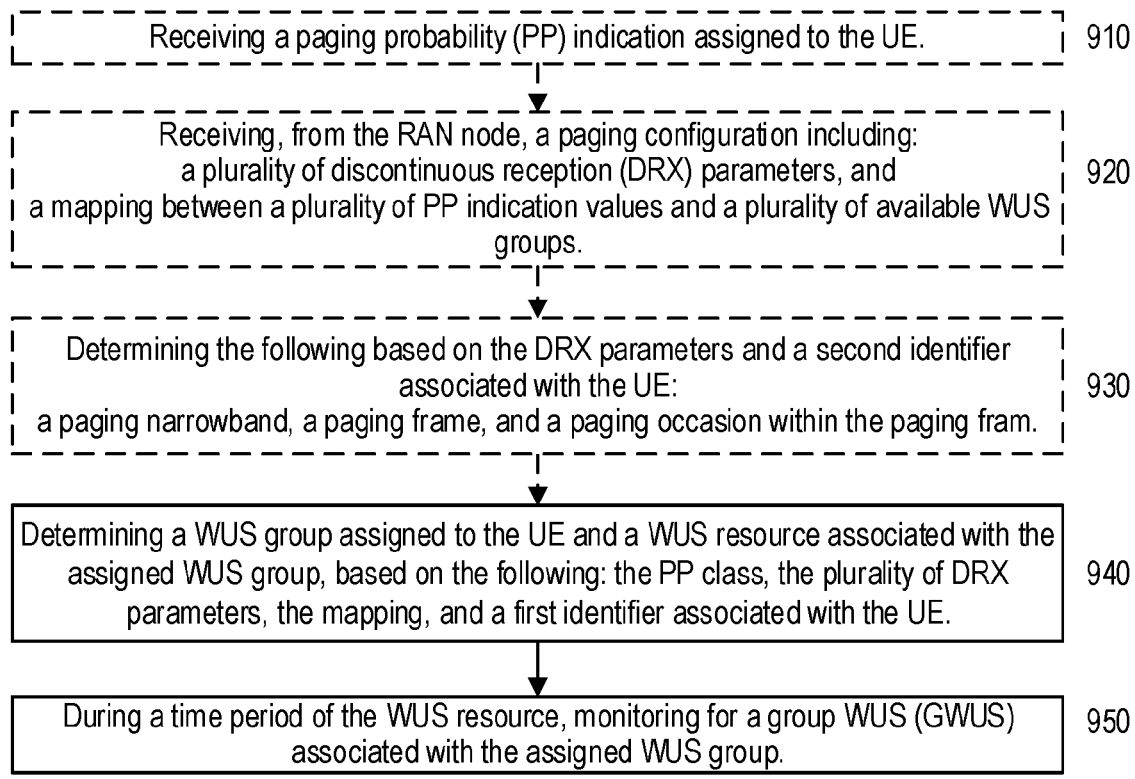
FIG. 9 is a flow diagram illustrating exemplary methods (e.g., procedures) for a user equipment (UE, e.g., wireless device, IoT device, MTC device, etc. or component(s) thereof), according to various exemplary embodiments of the present disclosure.
Figure 10:
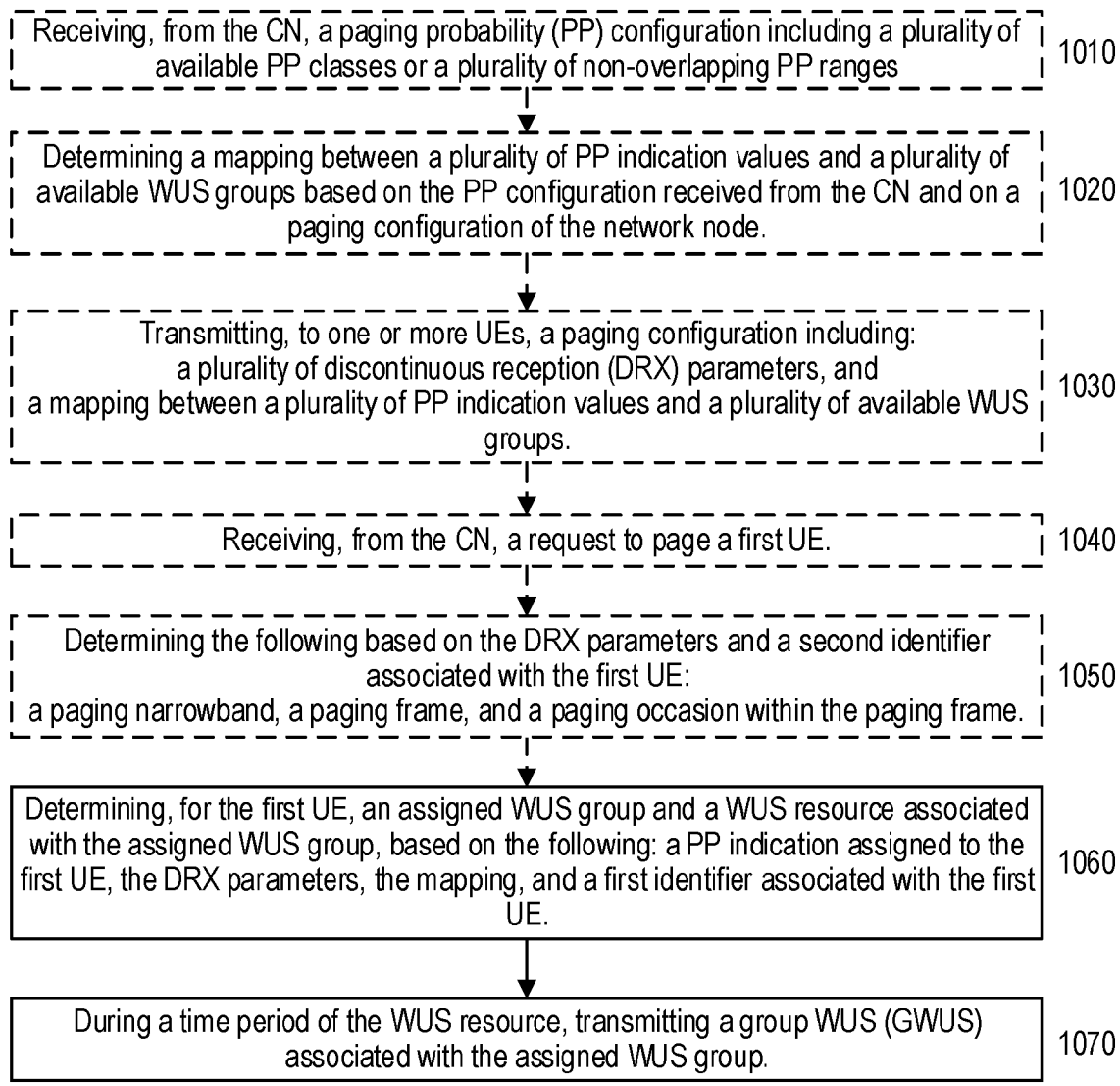
FIG. 10 is a flow diagram illustrating exemplary methods (e.g., procedures) for a radio access network (RAN) node (e.g., base station, eNB, gNB, etc. or component(s) thereof), according to various exemplary embodiments of the present disclosure.
Figure 11:
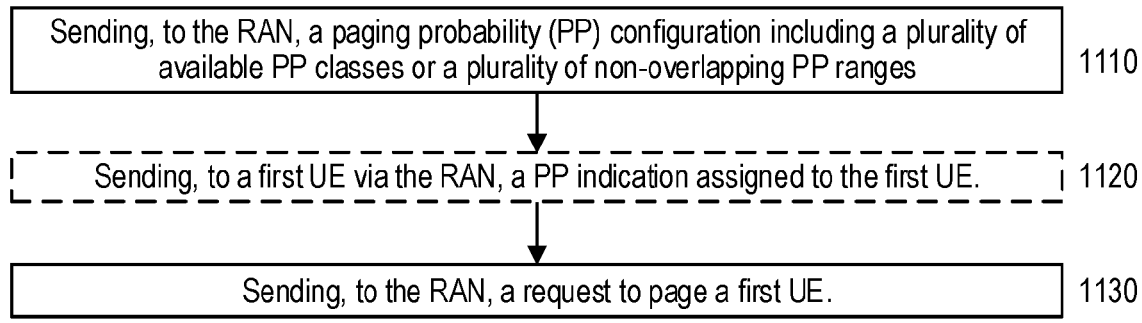
FIG. 11 is a flow diagram illustrating exemplary methods (e.g., procedures) for a core network (CN) node (e.g., MME, AMF, etc. or component(s) thereof), according to various exemplary embodiments of the present disclosure.

These embodiments briefly described above can be further illustrated with reference to FIGS. 9-11, which depict exemplary methods (e.g., procedures) for a UE, a RAN node, and a CN node, respectively. In other words, various features of the operations described below correspond to various embodiments described above. Furthermore, the exemplary methods shown in FIGS. 9-11 can be used cooperatively to provide various exemplary benefits described herein. Although FIGS. 9-11 show specific blocks in particular orders, the operations of the exemplary methods can be performed in different orders than shown and can be combined and/or divided into blocks having different functionality than shown. Optional blocks and/or operations are indicated by dashed lines.

More specifically, FIG. 9 is a flow diagram illustrating an exemplary method (e.g., procedure) for receiving wake-up signals (WUS) from a network node in a radio access network (RAN) coupled to a core network (CN), according to various exemplary embodiments of the present disclosure. The exemplary method can be implemented by a user equipment (UE, e.g., wireless device, IoT device, MTC device, etc. or component thereof) configured to operate in the RAN, such as by UEs described elsewhere herein.

The exemplary method can include the operations of block 940, in which the UE can determine a WUS group assigned to the UE and a WUS resource associated with the assigned WUS group, based on the following:
- a paging probability (PP) indication assigned to the UE,
- a plurality of discontinuous reception (DRX) parameters,
- a mapping between a plurality of PP indication values and a plurality of available WUS groups, and
- a first identifier associated with the UE.

The exemplary method can also include the operations of block 950, where the UE can, during a time period of the WUS resource, monitor for a group WUS (GWUS) associated with the assigned WUS group (e.g., determined in block 940).

In some embodiments, the exemplary method can also include the operations of block 920, in which the UE can receive, from the RAN node, a paging configuration that includes the DRX parameters and the mapping (i.e., between the plurality of PP indication values and the plurality of available WUS groups). In some embodiments, the mapping can include respective numbers of WUS groups allocated to respective ranges of PP indication values.

In some embodiments, the exemplary method can also include the operations of block 910, in which the UE can receive the PP indication assigned to the UE from a network node in the CN (e.g., MME via NAS signaling) or from a RAN node (e.g., serving eNB) that transmits the GWUS.

In some embodiments, the exemplary method can also include the operations of block 930, in which the UE can determine the following based on the DRX parameters and a second identifier associated with the UE: a paging narrowband, a paging frame (PF), and a paging occasion (PO) within the paging frame. In addition, the WUS resource (e.g., determined in block 940) is located within the paging narrowband and the time period of the WUS resource ends at the beginning of a WUS gap before the paging occasion. For example, the determination in block 930 can be performed using any of the mechanisms described herein that distribute UEs over paging narrowbands, PFs, POs, etc. in a substantially uniform and/or even manner.

In some embodiments, the first identifier and the second identifier can be different portions of a third identifier associated with the UE (e.g., an IMSI). In other embodiments, the first identifier and the second identifier can be different identifiers associated with the UE (e.g., IMSI and TMSI).

In some embodiments, the WUS resource (e.g., determined in block 940) can be one of a plurality of available WUS resources, and each available WUS group is associated with only one of the available WUS resources. In some of these embodiments, each available WUS resource can be associated with available WUS groups mapped to a single range of PP indication values, or a plurality of adjacent ranges of PP indication values.

In other of these embodiments, the available WUS groups are associated with sequential indices, and non-overlapping subsets of the sequential indices are associated with respective WUS resources, such that each available WUS group is mapped to one WUS resource (e.g., as illustrated in FIG. 6).

In some embodiments, determining the assigned WUS group (e.g., in block 940) can be based on a function of the following:
- a total number of WUS groups associated with the PP indication assigned to the UE,
- a total number of available paging narrowbands,
- the UE's DRX cycle duration, and
- the first identifier associated with the UE.

A specific example of these embodiments is equation (5a) above, in which:
- UE_ID is the first identifier associated with the UE,
- Nn is the total number of available paging narrowbands,
- nB is a paging occasion density for the UE,
- T is the UE's DRX cycle duration, and
- Nw is the total number of WUS groups associated with the PP indication assigned to the UE.

In addition, FIG. 10 is a flow diagram illustrating an exemplary method (e.g., procedure) for transmitting wake-up signals (WUS) to one or more user equipment (UEs), according to various exemplary embodiments of the present disclosure. The exemplary method shown in FIG. 10 can be implemented by a network node (e.g., eNB, gNB, or components thereof) of a RAN (e.g., E-UTRAN, NG-RAN, etc.) that is coupled to a core network (CN, e.g., EPC, 5GC), such as RAN nodes described elsewhere herein.

The exemplary method can include the operations of block 1060, in which the RAN node can determine, for a first UE, an assigned WUS group and a WUS resource associated with the assigned WUS group, based on the following:
- a paging probability (PP) indication assigned to the first UE,
- a plurality of discontinuous reception (DRX) parameters,
- a mapping between a plurality of PP indication values and a plurality of available WUS groups, and
- a first identifier associated with the first UE.

The exemplary method can also include the operations of block 1070, where the RAN node can, during a time period of the WUS resource, transmit a group WUS (GWUS) associated with the assigned WUS group (e.g., determined in block 1060).

In some embodiments, the exemplary method illustrated in FIG. 10 can include the operations of block 1010, in which the RAN node can receive, from the CN, a paging probability (PP) configuration including a plurality of available PP classes or a plurality of non-overlapping PP ranges. For example, the PP classes can be low, medium, high, etc. and the non-overlapping PP ranges can represent various percentages between 0 and 100, or various fractions between 0 and 1, such as described above.

In some embodiments, the received PP configuration can also include an approximate distribution of UEs among the available PP classes or the PP ranges. In other embodiments, the received PP configuration can also include one of the following:
- an approximate distribution of UEs among the available PP classes or the PP ranges, or
- assignments of one or more UEs to respective available PP classes or PP ranges.

In some embodiments, the exemplary method can also include the operations of block 1020, in which the RAN node can determine the mapping between the plurality of PP indication values and the plurality of available WUS groups based on the PP configuration received from the CN and on a paging configuration of the network node. In some embodiments, the mapping can include respective numbers of WUS groups allocated to respective ranges of PP indication values.

In some embodiments, the exemplary method can also include the operations of block 1030, in which the RAN node can transmit, to one or more UEs including the first UE, a paging configuration including the DRX parameters and the mapping. For example, the paging configuration can be broadcast as system information in a cell served by the network node.

In some embodiments, the exemplary method can also include the operations of block 1040, in which the RAN node can receive, from the CN, a request to page the first UE. The assigned WUS group and the WUS resource can be determined (e.g., in block 1060) in response to the request. In some embodiments, the request to page the first UE can also include the PP indication assigned to the first UE.

In some embodiments, the exemplary method can also include the operations of block 1050, in which the RAN node can determine the following based on the DRX parameters and a second identifier associated with the UE: a paging narrowband, a paging frame (PF), and a paging occasion (PO) within the paging frame. In addition, the WUS resource (e.g., determined in block 1060) is located within the paging narrowband and the time period of the WUS resource ends at the beginning of a WUS gap before the paging occasion. For example, the determination in block 1050 can be performed using any of the mechanisms described herein that distribute UEs over paging narrowbands, PFs, POs, etc. in a substantially uniform and/or even manner.

In some embodiments, the first identifier and the second identifier can be different portions of a third identifier associated with the UE (e.g., an IMSI). In other embodiments, the first identifier and the second identifier can be different identifiers associated with the UE (e.g., IMSI and TMSI).

In some embodiments, the WUS resource (e.g., determined in block 1060) can be one of a plurality of available WUS resources, and each available WUS group is associated with only one of the available WUS resources. In some of these embodiments, each available WUS resource can be associated with available WUS groups mapped to a single range of PP indication values, or to a plurality of adjacent ranges of PP indication values.

In other of these embodiments, the available WUS groups are associated with sequential indices, and non-overlapping subsets of the sequential indices are associated with respective WUS resources, such that each available WUS group is mapped to one WUS resource (e.g., as illustrated in FIG. 7).

In some embodiments, determining the assigned WUS group (e.g., in block 1060) can be based on a function of the following:
- a total number of WUS groups associated with the PP indication assigned to the UE,
- a total number of available paging narrowbands,
- the UE's DRX cycle duration, and
- the first identifier associated with the UE.

A specific example of these embodiments is equation (5a) above, in which:
- UE_ID is the first identifier associated with the UE,
- Nn is the total number of available paging narrowbands,
- nB is a paging occasion density for the UE,
- T is the UE's DRX cycle duration, and
- Nw is the total number of WUS groups associated with the PP indication assigned to the UE.

Note that operations performed by the RAN node in blocks 1050-1060 can be substantially the same as the operations performed by the UE in blocks 930-940 of FIG. 9.

Furthermore, FIG. 11 is a flow diagram illustrating an exemplary method (e.g., procedure) for facilitating a radio access network (RAN) to transmit wake-up signals (WUS) to one or more user equipment (UEs), according to various exemplary embodiments of the present disclosure. The exemplary method shown in FIG. 11 can be implemented by a node (e.g., MME, AMF, or components thereof) of a core network (CN, e.g., EPC, 5GC) coupled to the RAN (e.g., E-UTRAN, NG-RAN, etc.), such as by CN nodes described elsewhere herein.

The exemplary method illustrated in FIG. 11 can include the operations of block 1110, in which the CN node can send, to the RAN, a paging probability (PP) configuration including a plurality of available PP classes or a plurality of non-overlapping PP ranges. For example, the PP classes can be low, medium, high, etc. and the non-overlapping PP ranges can represent various percentages between 0 and 100, or various fractions between 0 and 1, such as described above. As a further example, each of the PP indication values discussed above in relation to the UE and RAN node embodiments can be within one of the plurality of non-overlapping PP ranges. In other examples, however, the PP indication values may be derived by the RAN based on the PP configuration provided by the CN.

The exemplary method can also include the operations of block 1130, in which the CN node can send, to the RAN, a request to page a first UE.

In some embodiments, the PP configuration can also include an approximate distribution of UEs among the PP classes or the PP ranges. In other embodiments, the PP configuration can also include assignments of one or more UEs to respective PP classes or PP ranges.

In some embodiments, the request to page the first UE also includes a PP indication assigned to the first UE. In other embodiments, the exemplary method can also include the operations of block 1120, in which the CN node can send, to the first UE via the RAN, a PP indication assigned to the first UE. For example, this information can be sent via NAS signaling, as discussed above.

Figure 12:
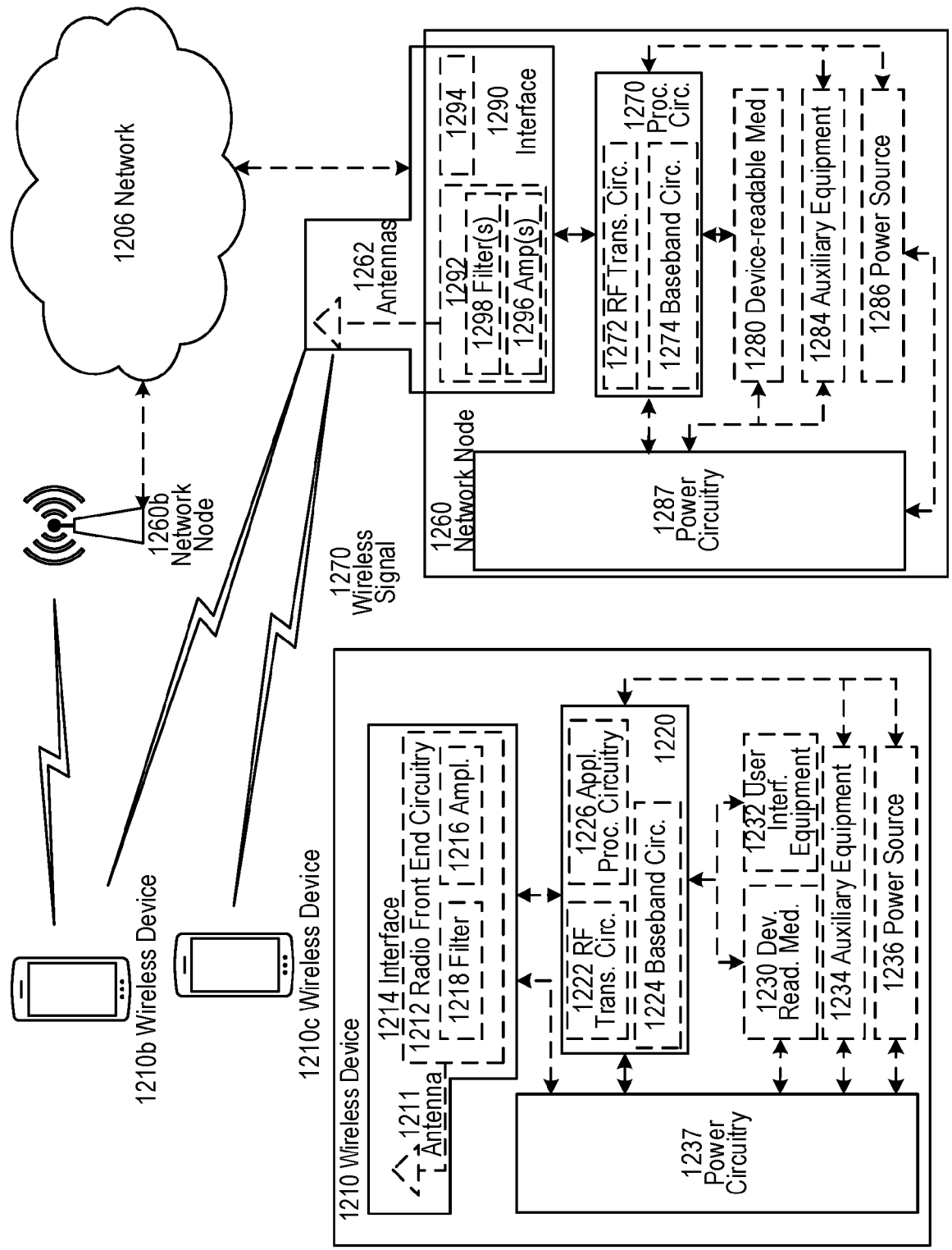
FIG. 12 illustrates an exemplary wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260*b*, and WDs 1210, 1210*b*, and 1210*c*. In practice, a wireless network can further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMES, S-GW, M-GW, etc.), core network functions (e.g., PCEF, PCRF, AMF, UPF, NEF, SMF, PCF, etc.), application functions (AF) associated with the core network, O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) or function capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 can represent a device that includes the illustrated combination of hardware components, other embodiments can comprise network nodes with different combinations of components. It is to be understood that a network node comprises any suitable combination of hardware and/or software needed to perform the tasks, features, functions, methods, and/or procedures disclosed herein. Moreover, while the components of network node 1260 are depicted as single boxes located within a larger box, or nested within multiple boxes, in practice, a network node can comprise multiple different physical components that make up a single illustrated component (e.g., device readable medium 1280 can comprise multiple separate hard drives as well as multiple RAM modules).

Similarly, network node 1260 can be composed of multiple physically separate components (e.g., a NodeB component and an RNC component, or a BTS component and a BSC to component, etc.), which can each have their own respective components. In certain scenarios in which network node 1260 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1260 can be configured to support multiple radio access technologies (RATs). In such embodiments, some components can be duplicated (e.g., separate device readable medium 1280 for the different RATs) and some components can be reused (e.g., the same antenna 1262 can be shared by the RATs). Network node 1260 can also include multiple sets of the various illustrated components for different wireless technologies integrated into network node 1260, such as, for example, GSM, WCDMA, LTE, NR, WiFi, or Bluetooth wireless technologies. These wireless technologies can be integrated into the same or different chip or set of chips and other components within network node 1260.

Processing circuitry 1270 can be configured to perform any determining, calculating, or similar operations (e.g., certain obtaining operations) described herein as being provided by a network node. These operations performed by processing circuitry 1270 can include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1260, either alone or in conjunction with other network node 1260 components (e.g., device readable medium 1280). Such functionality can include any of the various wireless features, functions, or benefits discussed herein.

For example, processing circuitry 1270 can execute instructions stored in device readable medium 1280 or in memory within processing circuitry 1270. In some embodiments, processing circuitry 1270 can include a system on a chip (SOC). As a more specific example, instructions (also referred to as a computer program product) stored in medium 1280 can include instructions that, when executed by processing circuitry 1270, can configure network node 1260 to perform operations corresponding to various exemplary methods (e.g., procedures) described herein.

In some embodiments, processing circuitry 1270 can include one or more of radio frequency (RF) transceiver circuitry 1272 and baseband processing circuitry 1274. In some embodiments, radio frequency (RF) transceiver circuitry 1272 and baseband processing circuitry 1274 can be on separate chips (or sets of chips), boards, or units, such as radio units and digital units. In alternative embodiments, part or all of RF transceiver circuitry 1272 and baseband processing circuitry 1274 can be on the same chip or set of chips, boards, or units In certain embodiments, some or all of the functionality described herein as being provided by a network node, base station, eNB or other such network device can be performed by processing circuitry 1270 executing instructions stored on device readable medium 1280 or memory within processing circuitry 1270. In alternative embodiments, some or all of the functionality can be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260 but are enjoyed by network node 1260 as a whole, and/or by end users and the wireless network generally.

Device readable medium 1280 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1270. Device readable medium 1280 can store any suitable instructions, data or information, including a computer program, software, an application including one or more of logic, rules, code, tables, etc. and/or other instructions capable of being executed by processing circuitry 1270 and, utilized by network node 1260. Device readable medium 1280 can be used to store any calculations made by processing circuitry 1270 and/or any data received via interface 1290. In some embodiments, processing circuitry 1270 and device readable medium 1280 can be considered to be integrated.

Interface 1290 is used in the wired or wireless communication of signaling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that can be coupled to, or in certain embodiments a part of, antenna 1262. Radio front end circuitry 1292 comprises filters 1298 and amplifiers 1296. Radio front end circuitry 1292 can be connected to antenna 1262 and processing circuitry 1270. Radio front end circuitry can be configured to condition signals communicated between antenna 1262 and processing circuitry 1270. Radio front end circuitry 1292 can receive digital data that is to be sent out to other network nodes or WDs via a wireless connection. Radio front end circuitry 1292 can convert the digital data into a radio signal having the appropriate channel and bandwidth parameters using a combination of filters 1298 and/or amplifiers 1296. The radio signal can then be transmitted via antenna 1262. Similarly, when receiving data, antenna 1262 can collect radio signals which are then converted into digital data by radio front end circuitry 1292. The digital data can be passed to processing circuitry 1270. In other embodiments, the interface can comprise different components and/or different combinations of components.

In certain alternative embodiments, network node 1260 may not include separate radio front end circuitry 1292, instead, processing circuitry 1270 can comprise radio front end circuitry and can be connected to antenna 1262 without separate radio front end circuitry 1292. Similarly, in some embodiments, all or some of RF transceiver circuitry 1272 can be considered a part of interface 1290. In still other embodiments, interface 1290 can include one or more ports or terminals 1294, radio front end circuitry 1292, and RF transceiver circuitry 1272, as part of a radio unit (not shown), and interface 1290 can communicate with baseband processing circuitry 1274, which is part of a digital unit (not shown).

Antenna 1262 can include one or more antennas, or antenna arrays, configured to send and/or receive wireless signals. Antenna 1262 can be coupled to radio front end circuitry 1290 and can be any type of antenna capable of transmitting and receiving data and/or signals wirelessly. In some embodiments, antenna 1262 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1262 can be separate from network node 1260 and can be connectable to network node 1260 through an interface or port.

Antenna 1262, interface 1290, and/or processing circuitry 1270 can be configured to perform any receiving operations and/or certain obtaining operations described herein as being performed by a network node. Any information, data and/or signals can be received from a wireless device, another network node and/or any other network equipment. Similarly, antenna 1262, interface 1290, and/or processing circuitry 1270 can be configured to perform any transmitting operations described herein as being performed by a network node. Any information, data and/or signals can be transmitted to a wireless device, another network node and/or any other network equipment.

Power circuitry 1287 can comprise, or be coupled to, power management circuitry and can be configured to supply the components of network node 1260 with power for performing the functionality described herein. Power circuitry 1287 can receive power from power source 1286. Power source 1286 and/or power circuitry 1287 can be configured to provide power to the various components of network node 1260 in a form suitable for the respective components (e.g., at a voltage and current level needed for each respective component). Power source 1286 can either be included in, or external to, power circuitry 1287 and/or network node 1260. For example, network node 1260 can be connectable to an external power source (e.g., an electricity outlet) via an input circuitry or interface such as an electrical cable, whereby the external power source supplies power to power circuitry 1287. As a further example, power source 1286 can comprise a source of power in the form of a battery or battery pack which is connected to, or integrated in, power circuitry 1287. The battery can provide backup power should the external power source fail. Other types of power sources, such as photovoltaic devices, can also be used.

Alternative embodiments of network node 1260 can include additional components beyond those shown in FIG. 12 that can be responsible for providing certain aspects of the network node's functionality, including any of the functionality described herein and/or any functionality necessary to support the subject matter described herein. For example, network node 1260 can include user interface equipment to allow and/or facilitate input of information into network node 1260 and to allow and/or facilitate output of information from network node 1260. This can allow and/or facilitate a user to perform diagnostic, maintenance, repair, and other administrative functions for network node 1260.

In some embodiments, a wireless device (WD, e.g., WD 1210) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 can include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies can be integrated into the same or different chips or set of chips as other components within WD 1210.

Antenna 1211 can include one or more antennas or antenna arrays, configured to send and/or receive wireless signals, and is connected to interface 1214. In certain alternative embodiments, antenna 1211 can be separate from WD 1210 and be connectable to WD 1210 through an interface or port. Antenna 1211, interface 1214, and/or processing circuitry 1220 can be configured to perform any receiving or transmitting operations described herein as being performed by a WD. Any information, data and/or signals can be received from a network node and/or another WD. In some embodiments, radio front end circuitry and/or antenna 1211 can be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220 and can be configured to condition signals communicated between antenna 1211 and processing circuitry ix) 1220. Radio front end circuitry 1212 can be coupled to or a part of antenna 1211. In some embodiments, WD 1210 may not include separate radio front end circuitry 1212; rather, processing circuitry 1220 can comprise radio front end circuitry and can be connected to antenna 1211. Similarly, in some embodiments, some or all of RF transceiver circuitry 1222 can be considered a part of interface 1214. Radio front end circuitry 1212 can receive digital data that is to be sent out to other network nodes or WDs via a wireless connection. Radio front end circuitry 1212 can convert the digital data into a radio signal having the appropriate channel and bandwidth parameters using a combination of filters 1218 and/or amplifiers 1216. The radio signal can then be transmitted via antenna 1211. Similarly, when receiving data, antenna 1211 can collect radio signals which are then converted into digital data by radio front end circuitry 1212. The digital data can be passed to processing circuitry 1220. In other embodiments, the interface can comprise different components and/or different combinations of components.

Processing circuitry 1220 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1210 functionality either alone or in combination with other WD 1210 components, such as device readable medium 1230. Such functionality can include any of the various wireless features or benefits discussed herein.

For example, processing circuitry 1220 can execute instructions stored in device readable medium 1230 or in memory within processing circuitry 1220 to provide the functionality disclosed herein. More specifically, instructions (also referred to as a computer program product) stored in medium 1230 can include instructions that, when executed by processing circuitry 1220, can configure wireless device 1210 to perform operations corresponding to various exemplary methods (e.g., procedures) described herein.

As illustrated, processing circuitry 1220 includes one or more of RF transceiver circuitry 1222, baseband processing circuitry 1224, and application processing circuitry 1226. In other embodiments, the processing circuitry can comprise different components and/or different combinations of components. In certain embodiments processing circuitry 1220 of WD 1210 can comprise a SOC. In some embodiments, RF transceiver circuitry 1222, baseband processing circuitry 1224, and application processing circuitry 1226 can be on separate chips or sets of chips. In alternative embodiments, part or all of baseband processing circuitry 1224 and application processing circuitry 1226 can be combined into one chip or set of chips, and RF transceiver circuitry 1222 can be on a separate chip or set of chips. In still alternative embodiments, part or all of RF transceiver circuitry 1222 and baseband processing circuitry 1224 can be on the same chip or set of chips, and application processing circuitry 1226 can be on a separate chip or set of chips. In yet other alternative embodiments, part or all of RF transceiver circuitry 1222, baseband processing circuitry 1224, and application processing circuitry 1226 can be combined in the same chip or set of chips. In some embodiments, RF transceiver circuitry 1222 can be a part of interface 1214. RF transceiver circuitry 1222 can condition RF signals for processing circuitry 1220.

In certain embodiments, some or all of the functionality described herein as being performed by a WD can be provided by processing circuitry 1220 executing instructions stored on device readable medium 1230, which in certain embodiments can be a computer-readable storage medium. In alternative embodiments, some or all of the functionality can be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 can be configured to perform any determining, calculating, or similar operations (e.g., certain obtaining operations) described herein as being performed by a WD. These operations, as performed by processing circuitry 1220, can include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 can be operable to store a computer program, software, an application including one or more of logic, rules, code, tables, etc. and/or other instructions capable of being executed by processing circuitry 1220. Device readable medium 1230 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1220. In some embodiments, processing circuitry 1220 and device readable medium 1230 can be considered to be integrated.

User interface equipment 1232 can include components that allow and/or facilitate a human user to interact with WD 1210. Such interaction can be of many forms, such as visual, audial, tactile, etc. User interface equipment 1232 can be operable to produce output to the user and to allow and/or facilitate the user to provide input to WD 1210. The type of interaction can vary depending on the type of user interface equipment 1232 installed in WD 1210. For example, if WD 1210 is a smart phone, the interaction can be via a touch screen; if WD 1210 is a smart meter, the interaction can be through a screen that provides usage (e.g., the number of gallons used) or a speaker that provides an audible alert (e.g., if smoke is detected). User interface equipment 1232 can include input interfaces, devices and circuits, and output interfaces, devices and circuits. User interface equipment 1232 can be configured to allow and/or facilitate input of information into WD 1210 and is connected to processing circuitry 1220 to allow and/or facilitate processing circuitry 1220 to process the input information. User interface equipment 1232 can include, for example, a microphone, a proximity or other sensor, keys/buttons, a touch display, one or more cameras, a USB port, or other input circuitry. User interface equipment 1232 is also configured to allow and/or facilitate output of information from WD 1210, and to allow and/or facilitate processing circuitry 1220 to output information from WD 1210. User interface equipment 1232 can include, for example, a speaker, a display, vibrating circuitry, a USB port, a headphone interface, or other output circuitry. Using one or more input and output interfaces, devices, and circuits, of user interface equipment 1232, WD 1210 can communicate with end users and/or the wireless network and allow and/or facilitate them to benefit from the functionality described herein.

Auxiliary equipment 1234 is operable to provide more specific functionality which may not be generally performed by WDs. This can comprise specialized sensors for doing measurements for various purposes, interfaces for additional types of communication such as wired communications etc. The inclusion and type of components of auxiliary equipment 1234 can vary depending on the embodiment and/or scenario.

Power source 1236 can, in some embodiments, be in the form of a battery or battery pack. Other types of power sources, such as an external power source (e.g., an electricity outlet), photovoltaic devices or power cells, can also be used. WD 1210 can further comprise power circuitry 1237 for delivering power from power source 1236 to the various parts of WD 1210 which need power from power source 1236 to carry out any functionality described or indicated herein. Power circuitry 1237 can in certain embodiments comprise power management circuitry. Power circuitry 1237 can additionally or alternatively be operable to receive power from an external power source; in which case WD 1210 can be connectable to the external power source (such as an electricity outlet) via input circuitry or an interface such as an electrical power cable. Power circuitry 1237 can also in certain embodiments be operable to deliver power from an external power source to power source 1236. This can be, for example, for the charging of power source 1236. Power circuitry 1237 can perform any converting or other modification to the power from power source 1236 to make it suitable for supply to the respective components of WD 1210.

Figure 13:
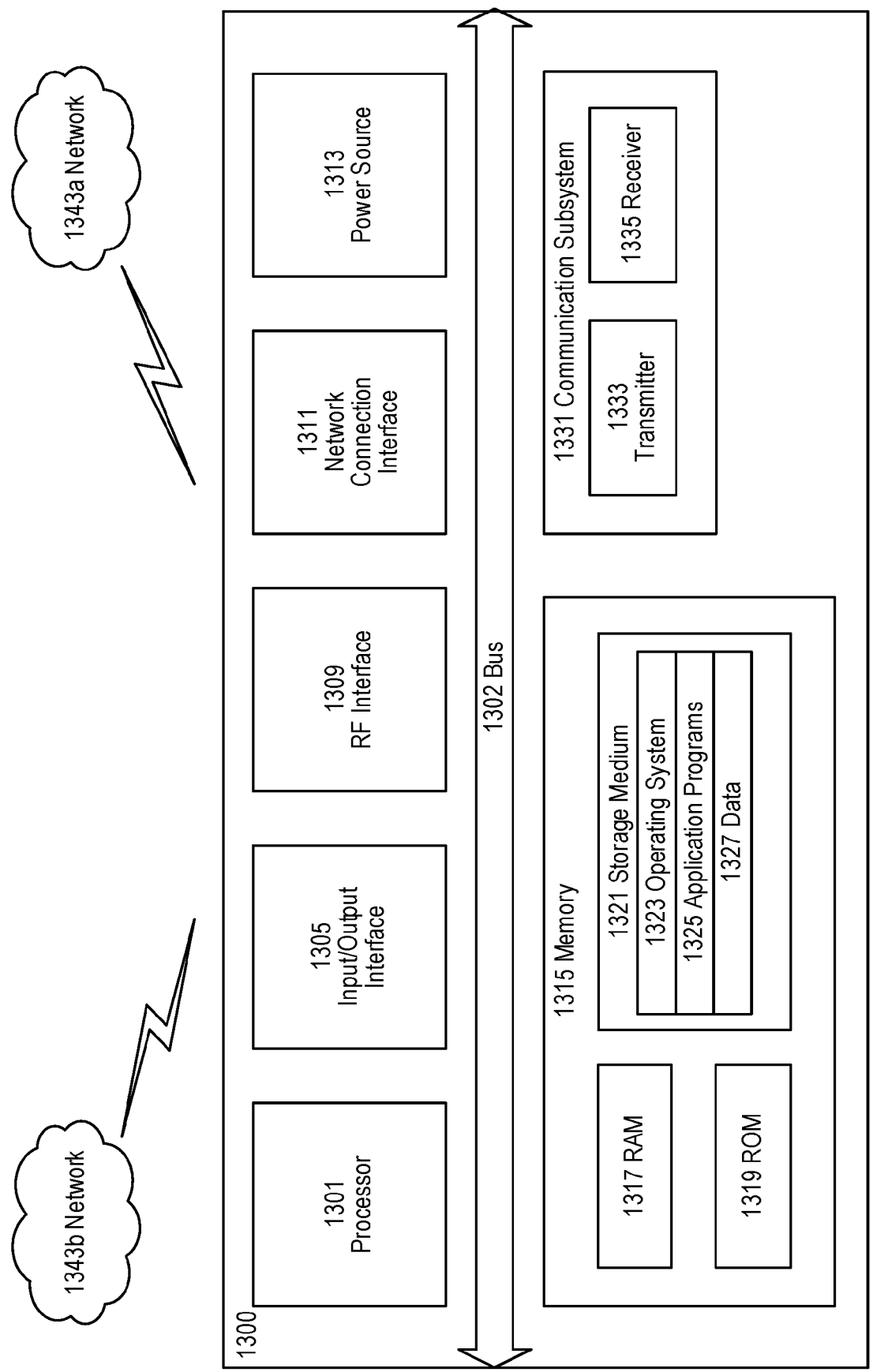
FIG. 13 illustrates an exemplary UE, according to various exemplary embodiments of the present disclosure.

FIG. 13 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1300 can be any UE identified by the $3^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 can include other similar types of information. Certain UEs can utilize all of the components shown in FIG. 13, or only a subset of the components. The level of integration between the components can vary from one UE to another UE.

Further, certain UEs can contain multiple instances of a component, such as multiple processors, memories, transceivers, transmitters, receivers, etc.

In FIG. 13, processing circuitry 1301 can be configured to process computer instructions and data. Processing circuitry 1301 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 can include two central processing units (CPUs). Data can be information in a form suitable for use by a computer.

In the depicted embodiment, input/output interface 1305 can be configured to provide a communication interface to an input device, output device, or input and output device. UE 1300 can be configured to use an output device via input/output interface 1305. An output device can use the same type of interface port as an input device. For example, a USB port can be used to provide input to and output from UE 1300. The output device can be a speaker, a sound card, a video card, a display, a monitor, a printer, an actuator, an emitter, a smartcard, another output device, or any combination thereof. UE 1300 can be configured to use an input device via input/output interface 1305 to allow and/or facilitate a user to capture information into UE 1300. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 13, RF interface 1309 can be configured to provide a communication interface to RF components such as a transmitter, a receiver, and an antenna. Network connection interface 1311 can be configured to provide a communication interface to network 1343a. Network 1343a can encompass wired and/or wireless networks such as a local-area network (LAN), a wide-area network (WAN), a computer network, a wireless network, a telecommunications network, another like network or any combination thereof. For example, network 1343a can comprise a Wi-Fi network. Network connection interface 1311 can be configured to include a receiver and a transmitter interface used to communicate with one or more other devices over a communication network according to one or more communication protocols, such as Ethernet, TCP/IP, SONET, ATM, or the like. Network connection interface 1311 can implement receiver and transmitter functionality appropriate to the communication network links (e.g., optical, electrical, and the like). The transmitter and receiver functions can share circuit components, software or firmware, or alternatively can be implemented separately.

RAM 1317 can be configured to interface via bus 1302 to processing circuitry 1301 to provide storage or caching of data or computer instructions during the execution of software programs such as the operating system, application programs, and device drivers. ROM 1319 can be configured to provide computer instructions or data to processing circuitry 1301. For example, ROM 1319 can be configured to store invariant low-level system code or data for basic system functions such as basic input and output (I/O), startup, or reception of keystrokes from a keyboard that are stored in a non-volatile memory. Storage medium 1321 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1321 can be configured to include operating system 1323; application program 1325 such as a web browser application, a widget or gadget engine or another application; and data file 1327. Storage medium 1321 can store, for use by UE 1300, any of a variety of various operating systems or combinations of operating systems. For example, application program 1325 can include executable program instructions (also referred to as a computer program product) that, when executed by processor 1301, can configure UE 1300 to perform operations corresponding to various exemplary methods (e.g., procedures) described herein.

Storage medium 1321 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 can allow and/or facilitate UE 1300 to access computer-executable instructions, application programs or the like, stored on transitory or non-transitory memory media, to off-load data, or to upload data. An article of manufacture, such as one utilizing a communication system can be tangibly embodied in storage medium 1321, which can comprise a device readable medium.

In FIG. 13, processing circuitry 1301 can be configured to communicate with network 1343b using communication subsystem 1331. Network 1343a and network 1343b can be the same network or networks or different network or networks. Communication subsystem 1331 can be configured to include one or more transceivers used to communicate with network 1343b. For example, communication subsystem 1331 can be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver can include transmitter 1333 and/or receiver 1335 to implement transmitter or receiver functionality, respectively, appropriate to the RAN links (e.g., frequency allocations and the like). Further, transmitter 1333 and receiver 1335 of each transceiver can share circuit components, software or firmware, or alternatively can be implemented separately.

In the illustrated embodiment, the communication functions of communication subsystem 1331 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 can include cellular communication, Wi-Fi communication, Bluetooth communication, and GPS communication. Network 1343*b* can encompass wired and/or wireless networks such as a local-area network (LAN), a wide-area network (WAN), a computer network, a wireless network, a telecommunications network, another like network or any combination thereof. For example, network 1343*b* can be a cellular network, a Wi-Fi network, and/or a near-field network. Power source 1313 can be configured to provide alternating current (AC) or direct current (DC) power to components of UE 1300.

The features, benefits and/or functions described herein can be implemented in one of the components of UE 1300 or partitioned across multiple components of UE 1300. Further, the features, benefits, and/or functions described herein can be implemented in any combination of hardware, software or firmware. In one example, communication subsystem 1331 can be configured to include any of the components described herein. Further, processing circuitry 1301 can be configured to communicate with any of such components over bus 1302. In another example, any of such components can be represented by program instructions stored in memory that when executed by processing circuitry 1301 perform the corresponding functions described herein. In another example, the functionality of any of such components can be partitioned between processing circuitry 1301 and communication subsystem 1331. In another example, the non-computationally intensive functions of any of such components can be implemented in software or firmware and the computationally intensive functions can be implemented in hardware.

Figure 14:
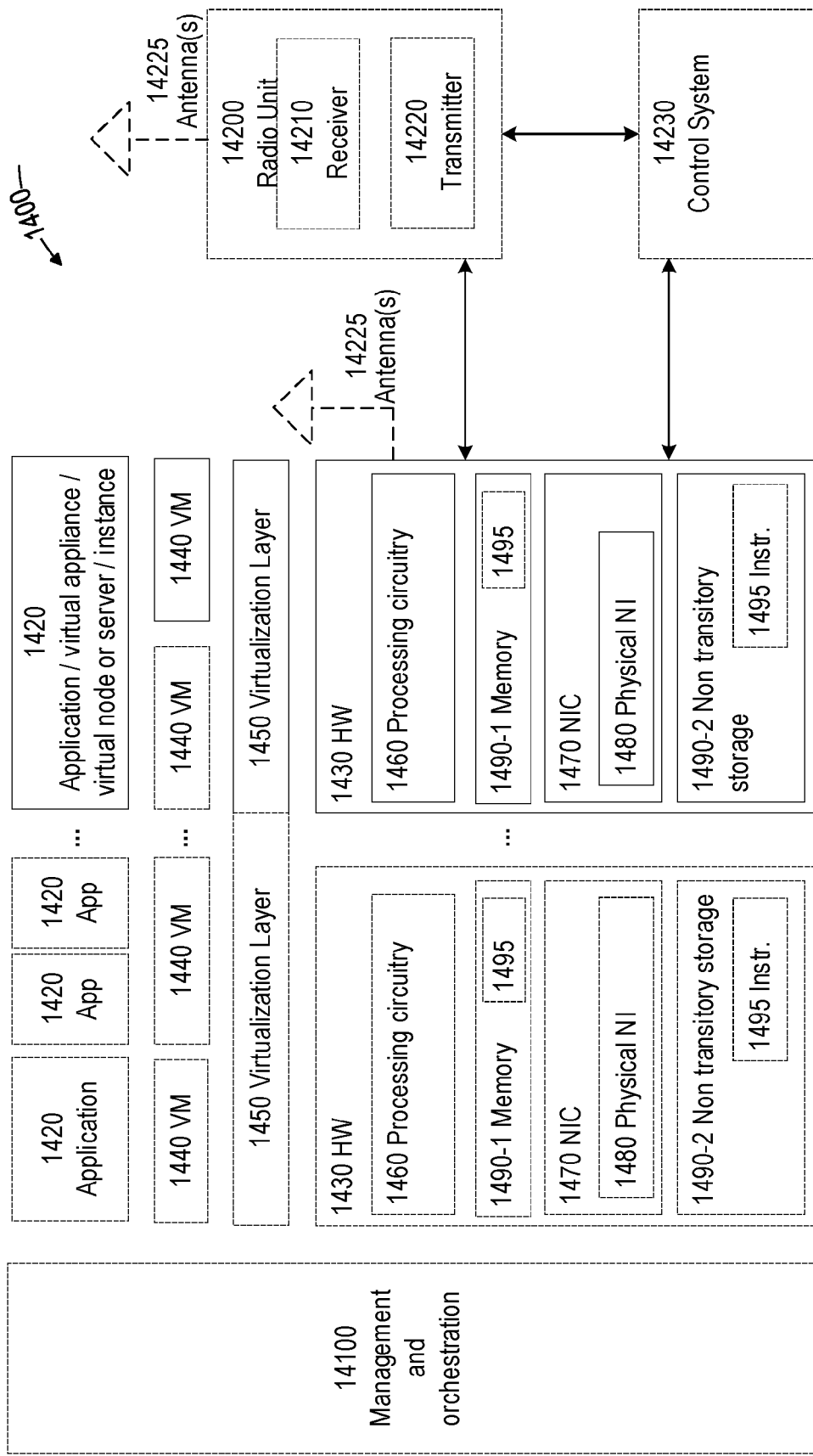
FIG. 14 is a block diagram illustrating an exemplary virtualization environment usable for implementing various exemplary embodiments of the present disclosure.

FIG. 14 is a schematic block diagram illustrating a virtualization environment 1400 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node can be entirely virtualized.

The functions can be implemented by one or more applications 1420 (which can alternatively be called software instances, virtual appliances, network functions, application functions, virtual nodes, virtual network functions, etc.) operative to implement some of the features, functions, and/or benefits of some of the embodiments disclosed herein. Applications 1420 (including, e.g., network functions and/or application functions) are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400 can include general-purpose or special-purpose network hardware devices (or nodes) 1430 comprising a set of one or more processors or processing circuitry 1460, which can be commercial off-the-shelf (COTS) processors, dedicated Application Specific Integrated Circuits (ASICs), or any other type of processing circuitry including digital or analog hardware components or special purpose processors. Each hardware device can comprise memory 1490-1 which can be non-persistent memory for temporarily storing instructions 1495 or software executed by processing circuitry 1460. For example, instructions 1495 can include program instructions (also referred to as a computer program product) that, when executed by processing circuitry 1460, can configure hardware node 1420 to perform operations corresponding to various exemplary methods (e.g., procedures) described herein. Such operations can also be attributed to virtual node(s) 1420 that is/are hosted by hardware node 1430.

Each hardware device can comprise one or more network interface controllers (NICs) 1470, also known as network interface cards, which include physical network interface 1480. Each hardware device can also include non-transitory, persistent, machine-readable storage media 1490-2 having stored therein software 1495 and/or instructions executable by processing circuitry 1460. Software 1495 can include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and can be run by a corresponding virtualization layer 1450 or hypervisor. Different embodiments of the instance of virtual appliance 1420 can be implemented on one or more of virtual machines 1440, and the implementations can be made in different ways.

During operation, processing circuitry 1460 executes software 1495 to instantiate the hypervisor or virtualization layer 1450, which can sometimes be referred to as a virtual machine monitor (VMM). Virtualization layer 1450 can present a virtual operating platform that appears like networking hardware to virtual machine 1440.

As shown in FIG. 14, hardware 1430 can be a standalone network node with generic or specific components. Hardware 1430 can comprise one or more antennas 14205 and can implement some functions via virtualization. Alternatively, hardware 1430 can be part of a larger cluster of hardware (e.g., such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1440 can be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 can be coupled to one or more antennas 14205. Radio units 14200 can communicate directly with hardware nodes 1430 via one or more appropriate network interfaces and can be used in combination with the virtual components to provide a virtual node with radio capabilities, such as a radio access node or a base station. Nodes arranged in this manner can also communicate with one or more UEs, such as described elsewhere herein. In some embodiments, some signaling can be performed via control system 14230, which can be used for communication between the hardware nodes 1430 and radio units 14200.

Figure 15:
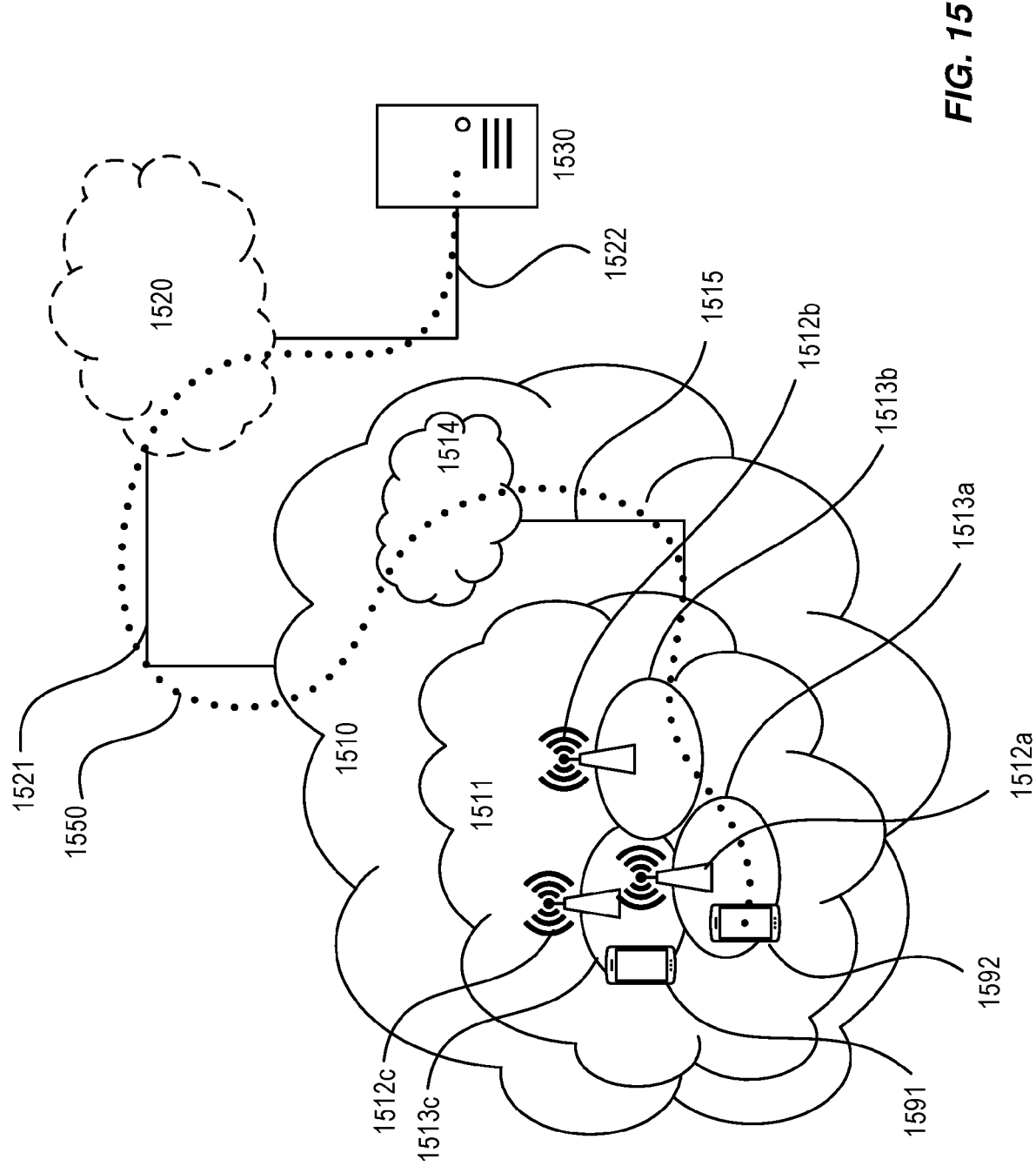
FIGS. 15-16 are block diagrams of exemplary communication systems and/or networks, according to various exemplary embodiments of the present disclosure.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512*a*, 1512*b*, 1512*c*, such as NBs, eNBs, gNBs or other types of wireless access points, each defining a corresponding coverage area 1513*a*, 1513*b*, 1513*c*. Each base station 1512*a*, 1512*b*, 1512*c* is connectable to core network 1514 over a wired or wireless connection 1515. A first UE 1591 located in coverage area 1513*c* can be configured to wirelessly connect to, or be paged by, the corresponding base station 1512*c*. A second UE 1592 in coverage area 1513*a* is wirelessly connectable to the corresponding base station 1512*a*. While a plurality of UEs 1591, 1592 are illustrated in this example, the disclosed embodiments are equally applicable to a situation where a sole UE is in the coverage area or where a sole UE is connecting to the telecommunication network 1510.

Telecommunication network 1510 is itself connected to host computer 1530, which can be embodied in the hardware and/or software of a standalone server, a cloud-implemented server, a distributed server or as processing resources in a server farm. Host computer 1530 can be under the ownership or control of a service provider or can be operated by the service provider or on behalf of the service provider. Connections 1521 and 1522 between telecommunication network 1510 and host computer 1530 can extend directly from core network 1514 to host computer 1530 or can go via an optional intermediate network 1520. Intermediate network 1520 can be one of, or a combination of more than one of, a public, private or hosted network; intermediate network 1520, if any, can be a backbone network or the Internet; in particular, intermediate network 1520 can comprise two or more sub-networks (not shown).

The communication system of FIG. 15 as a whole enables connectivity between the connected UEs 1591, 1592 and host computer 1530. The connectivity can be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 can be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with various embodiments, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which can have storage and/or processing capabilities. In particular, processing circuitry 1618 can comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 can be operable to provide a service to a remote user, such as UE 1630 connecting via OTT connection 1650 terminating at UE 1630 and host computer 1610. In providing the service to the remote user, host application 1612 can provide user data which is transmitted using OTT connection 1650.

Communication system 1600 can also include base station 1620 provided in a telecommunication system and comprising hardware 1625 enabling it to communicate with host computer 1610 and with UE 1630. Hardware 1625 can include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 can be configured to facilitate connection 1660 to host computer 1610. Connection 1660 can be direct, or it can pass through a core network (not shown in FIG. 16) of the telecommunication system and/or through one or more intermediate networks outside the telecommunication system. In the embodiment shown, hardware 1625 of base station 1620 can also include processing circuitry 1628, which can comprise one or more programmable processors, application-specific integrated circuits, field programmable gate arrays or combinations of these (not shown) adapted to execute instructions.

Base station 1620 also includes software 1621 stored internally or accessible via an external connection. For example, software 1621 can include program instructions (also referred to as a computer program product) that, when executed by processing circuitry 1628, can configure base station 1620 to perform operations corresponding to various exemplary methods (e.g., procedures) described herein.

Communication system 1600 can also include UE 1630 already referred to, whose hardware 1635 can include radio interface 1637 configured to set up and maintain wireless connection 1670 with a base station serving a coverage area in which UE 1630 is currently located. Hardware 1635 of UE 1630 can also include processing circuitry 1638, which can comprise one or more programmable processors, application-specific integrated circuits, field programmable gate arrays or combinations of these (not shown) adapted to execute instructions.

UE 1630 also includes software 1631, which is stored in or accessible by UE 1630 and executable by processing circuitry 1638. Software 1631 includes client application 1632. Client application 1632 can be operable to provide a service to a human or non-human user via UE 1630, with the support of host computer 1610. In host computer 1610, an executing host application 1612 can communicate with the executing client application 1632 via OTT connection 1650 terminating at UE 1630 and host computer 1610. In providing the service to the user, client application 1632 can receive request data from host application 1612 and provide user data in response to the request data. OTT connection 1650 can transfer both the request data and the user data. Client application 1632 can interact with the user to generate the user data that it provides. Software 1631 can also include program instructions (also referred to as a computer program product) that, when executed by processing circuitry 1638, can configure UE 1630 to perform operations corresponding to various exemplary methods (e.g., procedures) described herein.

Figure 16:
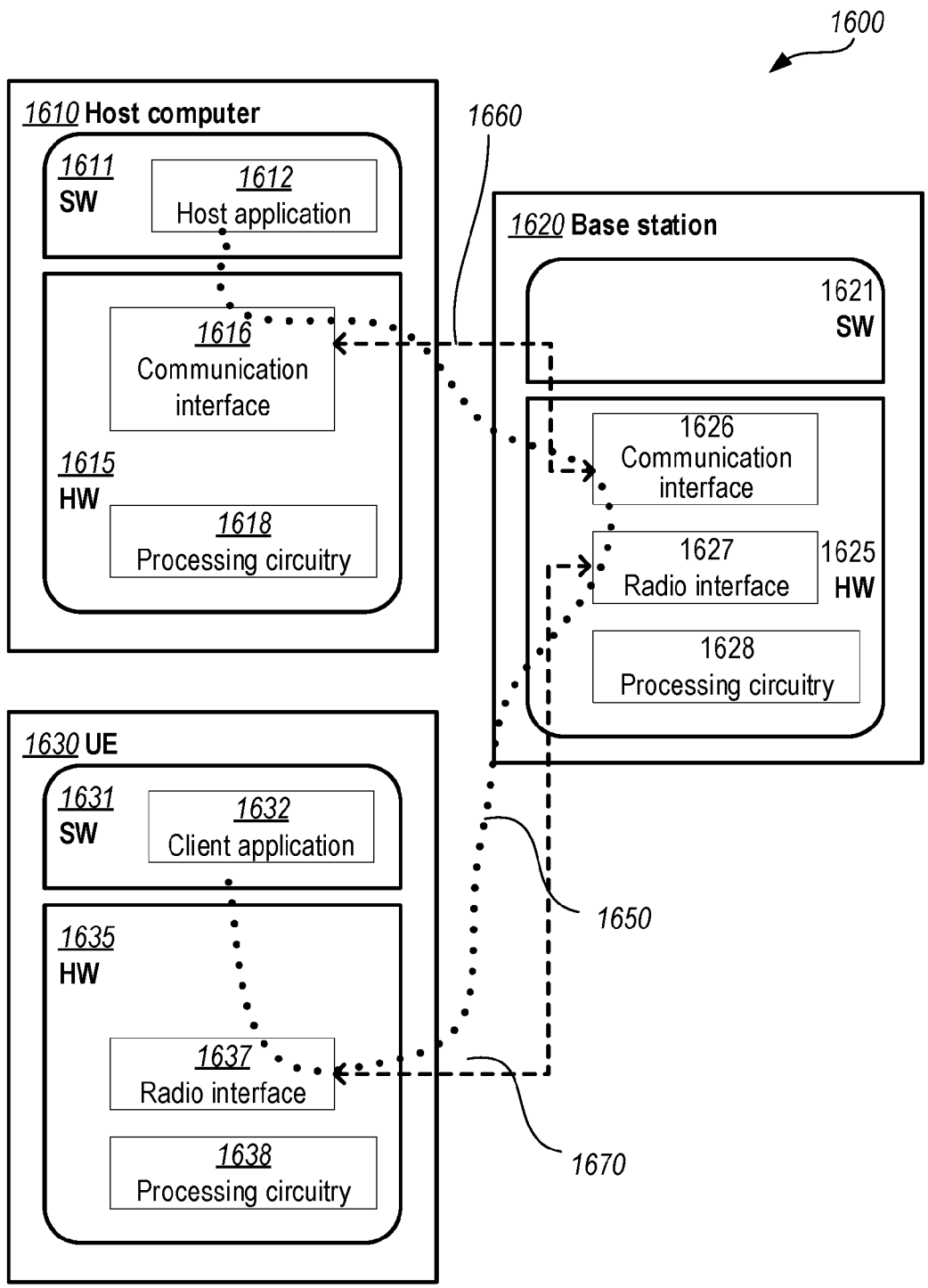

It is noted that host computer 1610, base station 1620 and UE 1630 illustrated in FIG. 16 can be similar or identical to host computer 1230, one of base stations 1612a, 1612b, 1612c and one of UEs 1691, 1692 of FIG. 16, respectively. This is to say, the inner workings of these entities can be as shown in FIG. 16 and independently, the surrounding network topology can be that of FIG. 16.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure can determine the routing, which it can be configured to hide from UE 1630 or from the service provider operating host computer 1610, or both. While OTT connection 1650 is active, the network infrastructure can further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1650 between host computer 1610 and UE 1630, in response to variations in the measurement results. The measurement procedure and/or the network functionality for reconfiguring OTT connection 1650 can be implemented in software 1611 and hardware 1615 of host computer 1610 or in software 1631 and hardware 1635 of UE 1630, or both. In embodiments, sensors (not shown) can be deployed in or in association with communication devices through which OTT connection 1650 passes; the sensors can participate in the measurement procedure by supplying values of the monitored quantities exemplified above, or supplying values of other physical quantities from which software 1611, 1631 can compute or estimate the monitored quantities. The reconfiguring of OTT connection 1650 can include message format, retransmission settings, preferred routing etc.; the reconfiguring need not affect base station 1620, and it can be unknown or imperceptible to base station 1620. Such procedures and functionalities can be known and practiced in the art. In certain embodiments, measurements can involve proprietary UE signaling facilitating host computer 1610's measurements of throughput, propagation times, latency and the like. The measurements can be implemented in that software 1611 and 1631 causes messages to be transmitted, in particular empty or 'dummy' messages, using OTT connection 1650 while it monitors propagation times, errors, etc.

FIG. 17 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 17 will be included in this section. In step 1710, the host computer provides user data. In substep 1711 (which can be optional) of step 1710, the host computer provides the user data by executing a host application. In step 1720, the host computer initiates a transmission carrying the user data to the UE. In step 1730 (which can be optional), the base station transmits to the UE the user data which was carried in the transmission that the host computer initiated, in accordance with the teachings of the embodiments described throughout this disclosure. In step 1740 (which can also be optional), the UE executes a client application associated with the host application executed by the host computer.

FIG. 18 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 18 will be included in this section. In step 1810 of the method, the host computer provides user data. In an optional sub step (not shown) the host computer provides the user data by executing a host application. In step 1820, the host computer initiates a transmission carrying the user data to the UE. The transmission can pass via the base station, in accordance with the teachings of the embodiments described throughout this disclosure. In step 1830 (which can be optional), the UE receives the user data carried in the transmission.

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 (which can be optional), the UE receives input data provided by the host computer. Additionally or alternatively, in step 1920, the UE provides user data. In substep 1921 (which can be optional) of step 1920, the UE provides the user data by executing a client application. In substep 1911 (which can be optional) of step 1910, the UE executes a client application which provides the user data in reaction to the received input data provided by the host computer. In providing the user data, the executed client application can further consider user input received from the user. Regardless of the specific manner in which the user data was provided, the UE initiates, in substep 1930 (which can be optional), transmission of the user data to the host computer. In step 1940 of the method, the host computer receives the user data transmitted from the UE, in accordance with the teachings of the embodiments described throughout this disclosure.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), in accordance with the teachings of the embodiments described throughout this disclosure, the base station receives user data from the UE. In step 2020 (which can be optional), the base station initiates transmission of the received user data to the host computer. In step 2030 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

Example embodiments of the techniques and apparatus described herein include, but are not limited to, the following enumerated examples:

E1. A method, performed by a user equipment (UE), for receiving wake-up signals (WUS) transmitted by a network node in a radio access network (RAN) coupled to a core network (CN), the method comprising:
- receiving a paging probability (PP) class assigned to the UE;
- receiving, from the RAN node, a paging configuration including:
  - a plurality of discontinuous reception (DRX) parameters, and
  - a mapping between one or more available PP classes and one or more corresponding available WUS groups;
- determining an assigned WUS group and a WUS resource, associated with the assigned WUS group, based on the following: the PP class assigned to the UE, the DRX parameters, the mapping, and a first identifier associated with the UE; and
- during a paging occasion, monitoring the WUS resource for a WUS associated with the assigned WUS group.

E2. The method of embodiment E1, further comprising determining the following based on the DRX parameters and a second identifier associated with the UE:
- a paging narrowband,
- a paging frame, and
- the paging occasion within the paging frame,
- wherein the WUS resource is located within the paging narrowband during the paging occasion.

E3. The method of embodiment E2, wherein one of the following is true:
- the first identifier and the second identifier are different portions of a third identifier associated with the UE; or
- the first identifier and the second identifier are different identifiers associated with the UE.

E4. The method of any of embodiments E1-E3, wherein the mapping includes a number of WUS groups allocated to the assigned PP class.

E5. The method of any of embodiments E1-E4, wherein the PP class is received from one of the following:
- a network node in the CN, or
- to the network node, in the RAN, that transmits the WUS.

E6. The method of any of embodiments E1-E5, wherein:
- the WUS resource is one of a plurality of available WUS resources; and
- each available WUS group is associated with only one of the available WUS resources.

E7. The method of embodiment E6, wherein each available WUS resource is associated only with WUS groups that are mapped to one available PP class.

E8. The method of embodiment E6, wherein:
- the available WUS groups are associated with sequential indices; and
- non-overlapping subsets of the sequential indices are associated with respective WUS resources.

E9. A method, performed by a network node in a radio access network (RAN) coupled to a core network (CN), for transmitting wake-up signals (WUS) to one or more user equipment (UEs), the method comprising:
- transmitting, to one or more UEs, a paging configuration including:
  - a plurality of discontinuous reception (DRX) parameters, and
  - a mapping between one or more available paging probability (PP) classes and one or more corresponding available WUS groups;
- receiving, from the CN, a request to page a particular UE;
- determining an assigned WUS group and a WUS resource associated with the assigned WUS group, for the particular UE, based on the following:
  - a PP class assigned to the particular UE,
  - the DRX parameters,
  - the mapping, and
  - a first identifier associated with the particular UE; and
- during a paging occasion, transmitting a WUS associated with the assigned WUS group using the WUS resource.

E10. The method of embodiment E9, further comprising determining the following based on the DRX parameters and a second identifier associated with the particular UE:
- a paging narrowband,
- a paging frame, and
- the paging occasion within the paging frame,
- wherein the WUS resource is located within the paging narrowband during the paging occasion.

E11. The method of embodiment E10, wherein one of the following is true:
- the first identifier and the second identifier are different portions of a third identifier associated with the UE; or
- the first identifier and the second identifier are different identifiers associated with the UE.

E12. The method of any of embodiments E9-E11, wherein the mapping includes a number of WUS groups allocated to the PP class assigned to the particular UE.

E13. The method of any of embodiments E9-E12, wherein:
- the WUS resource is one of a plurality of available WUS resources; and
- each available WUS group is associated with only one of the available WUS resources.

E14. The method of embodiment E13, wherein each available WUS resource is associated only with WUS groups that are mapped to one available PP class.

E15. The method of embodiment E13, wherein:
- the available WUS groups are associated with sequential indices; and
- non-overlapping subsets of the sequential indices are associated with respective WUS resources.

E16. The method of any of embodiments E9-E15, further comprising receiving, from the CN, a PP configuration including a plurality of available PP classes or a plurality of non-overlapping PP ranges.

E17. The method of embodiment E16, wherein the received PP configuration also includes an approximate distribution of UEs among the available PP classes or the PP ranges.

E18. The method of embodiment E16, wherein the received PP configuration also includes assignments of one or more UEs to respective available PP classes or PP ranges.

E19. The method of any of embodiments E16-E18, further comprising determining the mapping between the available WUS groups and the available PP classes based on the PP configuration received from the CN and on a paging configuration of the network node.

E20. The method of any of embodiments E9-E19, wherein the paging request also includes the PP class assigned to the particular UE.

E21. A method, performed by a network node in a core network (CN) coupled to a radio access network (RAN), for facilitating the RAN to transmit wake-up signals (WUS) to one or more user equipment (UEs), the method comprising:
sending, to the RAN, a paging probability (PP) configuration comprising one of the following:
a plurality of PP classes, or
a plurality of non-overlapping PP ranges;
sending, to the RAN, a request to page a particular UE.

E22. The method of embodiment E21, wherein the PP configuration also includes an approximate distribution of UEs among the PP classes or the PP ranges.

E23. The method of embodiment E21, wherein the PP configuration also includes assignments of one or more UEs to respective PP classes or PP ranges.

E24. The method of any of embodiments E21-E23, wherein the paging request also includes a PP class assigned to the particular UE.

E25. The method of any of embodiments E21-E24, further comprising sending, to the particular UE via the RAN, an indication of a PP class assigned to the particular UE.

E26. A user equipment (UE) configured to receive wake-up signals (WUS) transmitted by a network node in a radio access network (RAN), the UE comprising:
radio interface circuitry configured to communicate with the network node; and
processing circuitry operably coupled to the radio interface circuitry, whereby the processing circuitry and the radio interface circuitry are configured to perform operations corresponding to any of the methods of embodiments E1-E8.

E27. A user equipment (UE) configured to receive wake-up signals (WUS) transmitted by a network node in a radio access network (RAN), the UE being further arranged to perform operations corresponding to any of the methods of embodiments E1-E8.

E28. A non-transitory, computer-readable medium storing computer-executable instructions that, when executed by processing circuitry of a user equipment (UE), configure the UE to perform operations corresponding to any of the methods of embodiments E1-E8.

E29. A computer program product comprising computer-executable instructions that, when executed by processing circuitry of a user equipment (UE), configure the UE to perform operations corresponding to any of the methods of embodiments E1-E8.

E30. A network node, in a radio access network (RAN) coupled to a core network (CN), configured to transmit wake-up signals (WUS) to one or more user equipment (UEs), the network node comprising:
radio interface circuitry operable to communicate with the UEs; and
processing circuitry coupled to the radio interface circuitry, whereby the processing circuitry and the radio interface circuitry are configured to perform operations corresponding to any of the methods of embodiments E9-E20.

E31. A network node, in a radio access network (RAN) coupled to a core network (CN), configured to transmit wake-up signals (WUS) to one or more user equipment (UEs), the network node being further arranged to perform operations corresponding to any of the methods of embodiments E9-E20.

E32. A non-transitory, computer-readable medium storing computer-executable instructions that, when executed by processing circuitry of a network node in a radio access network (RAN), configure the network node to perform operations corresponding to any of the methods of embodiments E9-E20.

E33. A computer program product comprising computer-executable instructions that, when executed by processing circuitry of a network node in a radio access network (RAN), configure the network node to perform operations corresponding to any of the methods of embodiments E9-E20.

E34. A network node, in a core network (CN) coupled to a radio access network (RAN), configured to facilitate the RAN to transmit wake-up signals (WUS) to one or more user equipment (UEs), the network node comprising:
interface circuitry operable to communicate with the RAN; and
processing circuitry coupled to the radio interface circuitry, whereby the processing circuitry and the radio interface circuitry are configured to perform operations corresponding to any of the methods of embodiments E21-E25.

E35. A network node, in a radio access network (RAN) coupled to a core network (CN), configured to transmit wake-up signals (WUS) to one or more user equipment (UEs), the network node being further arranged to perform operations corresponding to any of the methods of embodiments E21-E25.

E36. A non-transitory, computer-readable medium storing computer-executable instructions that, when executed by processing circuitry of a network node in a radio access network (RAN), configure the network node to perform operations corresponding to any of the methods of embodiments E21-E25.

E37. A computer program product comprising computer-executable instructions that, when executed by processing circuitry of a network node in a radio access network (RAN), configure the network node to perform operations corresponding to any of the methods of embodiments E21-E25.

The invention claimed is:

1. A method for a user equipment (UE) to receive wake-up signals (WUS) from a network node in a radio access network (RAN) coupled to a core network (CN), the method comprising:
determining a WUS group assigned to the UE and a WUS resource associated with the assigned WUS group, based on the following:
a paging probability (PP) indication assigned to the UE,
a plurality of discontinuous reception (DRX) parameters configured for the UE,
a mapping between a plurality of PP indications and a plurality of available WUS groups,
a total number of WUS groups associated with the PP indication assigned to the UE,
a total number of paging narrowbands available for group WUS (GWUS), and
a first identifier associated with the UE; and
during a time period of the WUS resource, monitoring for a GWUS associated with the assigned WUS group.

2. The method of claim 1, further comprising receiving, from the RAN node, a paging configuration including the DRX parameters and the mapping.

3. The method of claim 1, wherein:
the method further comprises determining the following based on the DRX parameters
and a second identifier associated with the UE:
a paging narrowband,
a paging frame, and a paging occasion within the paging frame; and
the WUS resource is located within the paging narrowband; and
the time period of the WUS resource ends at the beginning of a WUS gap before the paging occasion.

4. The method of claim 3, wherein one of the following applies:
the first identifier and the second identifier are different portions of a third identifier associated with the UE; or
the first identifier and the second identifier are different identifiers associated with the UE.

5. The method of claim 1, wherein the mapping includes respective numbers of WUS groups allocated to respective ranges of PP indications.

6. The method of claim 1, further comprising receiving the PP indication assigned to the UE from one of the following: a network node in the CN; or a RAN node that transmits the GWUS.

7. The method of claim 1, wherein:
the WUS resource is one of a plurality of available WUS resources; and
each available WUS group is associated with only one of the available WUS resources.

8. The method of claim 7, wherein each available WUS resource is associated with available WUS groups mapped to one of the following:
a single range of PP indications, or
a plurality of adjacent ranges of PP indications.

9. The method of claim 7, wherein:
the available WUS groups are associated with sequential indices; and
non-overlapping subsets of the sequential indices are associated with respective WUS resources, such that each available WUS group is mapped to one WUS resource.

10. The method of claim 1, wherein determining the assigned WUS group is based on the following function:

$$\operatorname{floor}(\operatorname{floor}(UE\_ID/(\min(T, nB) * \max(1, nB/T)))/Nn) \text{ modulo } Nw,$$

where UE_ID is the first identifier associated with the UE, Nn is the total number of available paging narrowbands, nB is a paging occasion density for the UE, T is the UE's DRX cycle duration, and Nw is the total number of WUS groups associated with the PP indication assigned to the UE.

11. A non-transitory, computer-readable medium storing computer-executable instructions that, when executed by processing circuitry of a user equipment (UE) configured to receive wake-up signals (WUS) from a network node of a radio access network (RAN) coupled to a core network (CN), configure the UE to perform operations corresponding to the method of claim 1.

12. A user equipment (UE) configured to receive wake-up signals (WUS) from a network node of a radio access network (RAN) coupled to a core network (CN), the UE comprising:
communication interface circuitry configured to communicate with the RAN; and
processing circuitry operably coupled to the communication interface circuitry, whereby the processing circuitry and the communication interface circuitry are configured to:
determine a WUS group assigned to the UE and a WUS resource associated with the assigned WUS group, based on the following:
a paging probability (PP) indication assigned to the UE,
a plurality of discontinuous reception (DRX) parameters configured for the UE,
a mapping between a plurality of PP indications and a plurality of available WUS groups,
a total number of WUS groups associated with the PP indication assigned to the UE,
a total number of paging narrowbands available for group WUS (GWUS), and
a first identifier associated with the UE; and
during a time period of the WUS resource, monitor for a GWUS associated with the assigned WUS group.

13. The UE of claim 12, the processing circuitry and the communication interface circuitry are further configured to receive, from the RAN node, a paging configuration including the DRX parameters and the mapping.

14. The UE of claim 12, wherein:
the processing circuitry and the communication interface circuitry are further configured to determine the following based on the DRX parameters and a second identifier associated with the UE:
a paging narrowband,
a paging frame, and
a paging occasion within the paging frame; and
the WUS resource is located within the paging narrowband; and
the time period of the WUS resource ends at the beginning of a WUS gap before the paging occasion.

15. The UE of claim 14, wherein one of the following applies:
the first identifier and the second identifier are different portions of a third identifier associated with the UE; or
the first identifier and the second identifier are different identifiers associated with the UE.

16. The UE of claim 12, wherein the mapping includes respective numbers of WUS groups allocated to respective ranges of PP indications.

17. The UE of claim 12, wherein:
the WUS resource is one of a plurality of available WUS resources; and
each available WUS group is associated with only one of the available WUS resources.

18. The UE of claim 17, wherein:
the available WUS groups are associated with sequential indices; and
non-overlapping subsets of the sequential indices are associated with respective WUS resources, such that each available WUS group is mapped to one WUS resource.

19. The UE of claim 17, wherein each available WUS resource is associated with available WUS groups mapped to one of the following:
a single range of PP indications, or
a plurality of adjacent ranges of PP indications.

* * * * *